United States Patent
Fan et al.

(10) Patent No.: US 9,769,206 B2
(45) Date of Patent: Sep. 19, 2017

(54) MODES OF POLICY PARTICIPATION FOR FEEDBACK INSTANCES

(71) Applicant: AT&T Intellectual Property I, L.P., Atlanta, GA (US)

(72) Inventors: James W. Fan, San Ramon, CA (US); Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 131 days.

(21) Appl. No.: 14/675,669

(22) Filed: Mar. 31, 2015

(65) Prior Publication Data

US 2016/0294873 A1     Oct. 6, 2016

(51) Int. Cl.
| | | |
|---|---|---|
| *H04L 29/06* | (2006.01) | |
| *G06F 11/00* | (2006.01) | |
| *G06F 21/55* | (2013.01) | |
| *G06Q 90/00* | (2006.01) | |

(52) U.S. Cl.
CPC .............. *H04L 63/20* (2013.01); *G06F 11/00* (2013.01); *G06F 21/55* (2013.01); *G06Q 90/00* (2013.01); *H04L 63/1416* (2013.01); *H04L 63/1425* (2013.01)

(58) Field of Classification Search
CPC .. H04L 63/20; H04L 63/1425; H04L 63/1416
USPC ............................................................ 726/1
See application file for complete search history.

(56) References Cited

U.S. PATENT DOCUMENTS

| | | |
|---|---|---|
| 7,574,496 B2 | 8/2009 | McCrory et al. |
| 8,121,024 B1 | 2/2012 | Natarajan et al. |
| 8,209,415 B2 | 6/2012 | Wei |
| 8,495,426 B2 | 7/2013 | Carter et al. |
| 8,612,599 B2 | 12/2013 | Tung et al. |
| 8,639,791 B2 | 1/2014 | Carter et al. |
| 8,769,068 B2 | 7/2014 | Alexander et al. |
| 8,769,644 B1 | 7/2014 | Eicken et al. |
| 8,789,179 B2 | 7/2014 | Sabin |
| 8,806,014 B2 | 8/2014 | Carter et al. |
| 8,856,308 B1 | 10/2014 | Bollay et al. |
| 2006/0075093 A1* | 4/2006 | Frattura .............. H04L 41/0681 709/224 |
| 2010/0036779 A1* | 2/2010 | Sadeh-Koniecpol ... H04L 63/20 706/11 |
| 2011/0126197 A1 | 5/2011 | Larsen et al. |
| 2012/0173709 A1 | 7/2012 | Li et al. |
| 2012/0179802 A1 | 7/2012 | Narasimhan et al. |
| 2012/0185913 A1 | 7/2012 | Martinez et al. |
| 2012/0297016 A1 | 11/2012 | Iyer et al. |

(Continued)

OTHER PUBLICATIONS

International Search Report and Written Opinion dated Jul. 5, 2016 in International Application No. PCT/US2016/025164.

(Continued)

*Primary Examiner* — Baotran N To
(74) *Attorney, Agent, or Firm* — Hartman & Citrin LLC

(57) ABSTRACT

Concepts and technologies disclosed herein are directed to modes of policy participation for feedback instances. According to one aspect, a system can receive an event associated with an active feedback instance operating in a runtime. The system can map the event to a policy participation level policy. The system can determine a new policy participation level for the active feedback instance according to the policy participation level policy.

20 Claims, 17 Drawing Sheets

(56) References Cited

U.S. PATENT DOCUMENTS

| | | |
|---|---|---|
| 2012/0297059 A1 | 11/2012 | Bross |
| 2013/0067090 A1 | 3/2013 | Batrouni et al. |
| 2013/0205028 A1 | 8/2013 | Crockett et al. |
| 2013/0232252 A1 | 9/2013 | Huang et al. |
| 2013/0268638 A1 | 10/2013 | Anderson et al. |
| 2013/0346619 A1 | 12/2013 | Panuganty et al. |
| 2014/0074973 A1 | 3/2014 | Kumar et al. |
| 2014/0196028 A1 | 7/2014 | Macpherson et al. |
| 2014/0207944 A1 | 7/2014 | Emaru |
| 2014/0258546 A1 | 9/2014 | Janssens et al. |
| 2014/0280488 A1 | 9/2014 | Voit et al. |
| 2014/0317681 A1 | 10/2014 | Shende |
| 2014/0365549 A1 | 12/2014 | Jenkins |
| 2015/0006711 A1 | 1/2015 | Schaad |

OTHER PUBLICATIONS

Porras et al., "EMERALD: Event Monitoring Enabling Responses to Anomalous Live Disturbances," $20^{th}$ National Information Systems Security Conference, Oct. 7-10, 1997, Baltimore, Maryland.

* cited by examiner

MODES OF POLICY PARTICIPATION FOR FEEDBACK INSTANCES

BACKGROUND

User-defined network cloud ("UDNC") strategic objectives include exploiting the economic advantages of running network functions on general purpose hardware platforms using cloud technology to manage resources elastically based upon business and technical policies. Services can be designed, created, deployed, and managed in near-real time, rather than requiring software development cycles to create or modify services. Enhanced control, orchestration, management, and policy ("ECOMP") is the framework that provides service creation and operational management of UDNC. ECOMP enables significant reductions in the time and cost required to develop, deploy, operate, and retire products, services, and networks.

Within ECOMP frameworks, policy has emerged as the brain trust that enables dynamic real-time decision making processes. Policy plays a key role in the "feedback instance" domain. A feedback instance typically involves at least two actors, including policy as one of the actors, but in many cases, a feedback instance involves more than two actors. Other common actors might include orchestrators, controllers, network functions, analytic modules, combinations thereof, and the like. In the current market, feedback instances are constructed statically to identify and/or to solve certain known anomalies. This approach will not scale up in the highly virtualized, real-time, and dynamic environment of UDNC.

SUMMARY

Concepts and technologies disclosed herein are directed to modes of policy participation for feedback instances. According to one aspect of the concepts and technologies disclosed herein, a system can receive an event associated with an active feedback instance operating in a runtime. The system can map the event to a policy participation level policy. The system can determine a new policy participation level for the active feedback instance according to the policy participation level policy.

In some embodiments, the system can subscribe to a plurality of events, including the event. The system also can monitor the plurality of events for instances thereof. In some embodiments, the system can receive the event associated with the active feedback instance as a result of a subscription to the event.

In some embodiments, the system can map the event to a set of policy participation level policies. The set of policy participation level policies can include the policy participation level policy to which the event is mapped.

In some embodiments, the system can determine a duration of the new policy participation level. In these embodiments, the system can revert back to an original policy participation level after the duration.

In some embodiments, the system can adjust a feedback instance model associated with the feedback instance to accommodate the new policy participation level. The system also can store the feedback instance model as adjusted in an active feedback instance model storage of a feedback instance model repository. The system can direct a further system to realize a further feedback instance based upon the feedback instance model.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
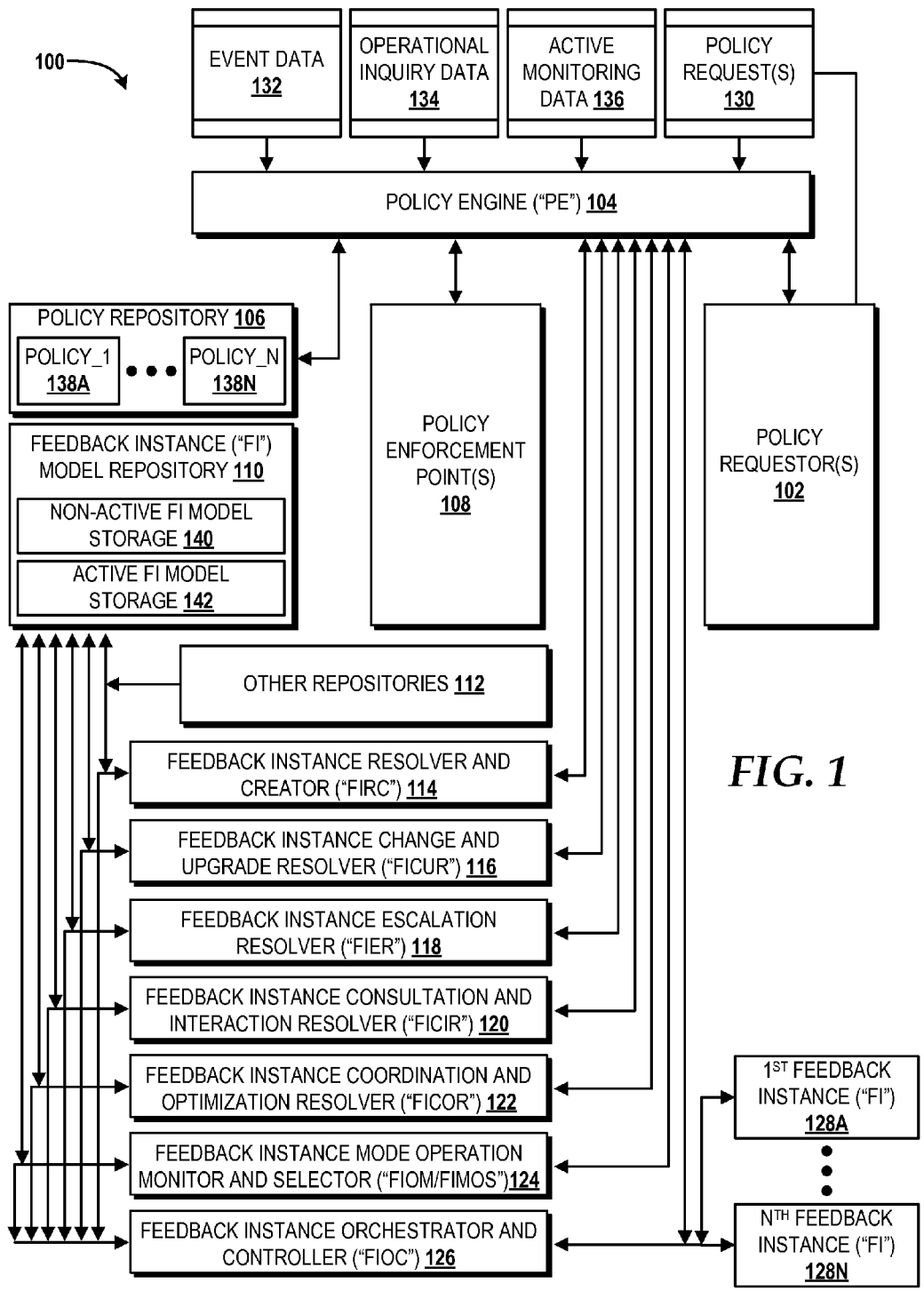
FIG. 1 is a block diagram illustrating aspects of a feedback instance architecture, according to an illustrative embodiment.

Currently, feedback instances are statically established and provisioned in different layers of a compute, storage, network, and management infrastructure. For each feedback instance provisioned in the layered infrastructure, data are collected, anomalies are analyzed, and actionable tasks are derived by a policy engine for enforcement components to execute. When the infrastructure becomes more complex, such as with hundreds of thousands of feedback instances running to track down problems and anomalies detected in both the virtual and physical world, drilling down and verifying the true root cause of these problems and anomalies based upon advanced policy constructs will be greatly increased.

Concepts and technologies disclosed herein are directed to the dynamic creation and management of ephemeral coordinated feedback instances to address the aforementioned problems and others that will become apparent after reading this disclosure. According to embodiments of the concepts and technologies disclosed herein, a new feedback instance can be created automatically or semi-automatically when a need is identified. A feedback instance model can be established based upon model templates and policies by a feedback instance resolver and creator entity. The objective(s) of the model can be identified based upon one or more requests. The target actors can be identified, input attributes can be collected, and analytic applications can be identified or created. The feedback instance model can be stored in a repository for later use. A feedback instance can be instantiated based upon the feedback instance model to be handled by another entity referred to herein as a feedback instance orchestrator and controller ("FIOC"). The FIOC entity can retrieve the feedback instance model from the repository, implement the model, verify the feedback instance model result, and activate a new feedback instance based upon the feedback instance model in production.

Other concepts and technologies disclosed herein are directed to policy-based modification of existing feedback instances. In accordance with one aspect disclosed herein, a feedback instance change and upgrade resolver ("FICUR") entity can modify feedback instance models based upon extensibility of one or more policies. More particularly, the FICUR entity can examine an original objective of a feedback instance model and can compare the original objective to a change/upgrade request. The original objective can be extended based upon one or more model extensibility policies to specify a modified objective. Additional attributes can be added to the feedback instance model based upon the modified objective. The realization of the modified feedback instance model can be handled by another entity referred to herein as a feedback instance orchestrator and controller ("FIOC"). The FIOC entity can retrieve the modified feedback instance model that the FICUR entity modified and can implement the modified portion of the modified feedback instance model to an existing feedback instance in production.

Other concepts and technologies disclosed herein are directed to the escalation of feedback instances. In accordance with one aspect disclosed herein, a policy driven feedback instance escalation resolver ("FIER") entity can enable a dynamic method of escalating from an original feedback instance to a different feedback instance in the same domain or across different domains. The FIER can refine the objective of the original feedback instance. Based on the refined objective, the FIER can search a plurality of active and non-active feedback interface models to determine one or more possible candidates. The FIER can then apply a distance calculation to obtain the highest score candidate. A model identifier is obtained from the highest score candidate. Realization of the feedback instance escalation can be handled by the FIOC. The FIOC can retrieve the model using the model identifier received from FIER from a model repository. If the feedback instance is in a non-active state, the FIER can re-activate the model first. The FIER can then associate an escalation plan to the escalated active model in runtime.

Other concepts and technologies disclosed herein are directed to consultation among feedback instances. In accordance with one aspect disclosed herein, a feedback instance consultation and interaction resolver ("FICIR") entity can enable a dynamic way for a feedback instance to issue a consultation request to another feedback instance in the same domain or across different domain(s). The FICIR entity can attempt to map the consultation request to an available application programming interface ("API") published by one or more feedback instances. If an available API is found, the FICIR entity can record a method of API invocation in an active feedback instance storage in association with a requesting feedback instance model. If no available API is found, the FICIR entity can map the consultation request to a closest match to a target feedback instance objective. Once matched, the FICIR entity can map the consultation request to an event type that the target feedback instance already supports. The FICIR entity can retrieve an event response that the target feedback instance publishes. An interaction mechanism can be recorded back to both the requesting feedback instance and the target feedback instance in the active feedback instance store. Realization of the feedback instance intercommunication can be handled by the FIOC entity. The FIOC entity can receive one or more model identifiers from the FICIR. The FIOC can use the model identifier(s) to retrieve the corresponding feedback instance model(s) from a model repository. The FIOC can enable/upgrade an intercommunication path between the requesting feedback instance and the target feedback instance.

Other concepts and technologies disclosed herein are directed to multiple feedback instance inter-coordination to determine optimal actions. In accordance with one aspect disclosed herein, a feedback instances coordination and optimization resolver ("FICOR") entity can receive events from a group of feedback instances. The FICOR can leverage policies to develop a coordinated optimization plan to optimize actions performed by the group of feedback instances. Realization of the coordinated optimization plan can be handled by the FIOC. The FIOC entity can interact with all participating feedback instances in the group and can execute the coordinated optimization plan to optimize actions performed by the group of feedback instances.

Other concepts and technologies disclosed herein are directed to modes of policy participation for feedback instances. A mode can represent a degree or level of guidance, constraints, and/or interactions provided by policy. Alternatively, or more generally, a mode can reflect different policy guidance, constraints, and/or interactions. In accordance with one aspect disclosed herein, a feedback instance can be adjusted and executed at an optimized policy participation level mode ("PPLM") based upon current feedback instance conditions. Explicit involvement of policy can be automatically or manually adjusted to a suitable mode based upon data associated with traffic conditions, computing resource conditions, network resource conditions, energy conditions, priority consideration, or a combination thereof.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Turning now to FIG. 1, a block diagram illustrating aspects of a feedback instance architecture 100 will be described, according to an illustrative embodiment. A feedback instance, as used herein, is an intentional, directed feedback loop that can be utilized to effect, at least in part, one or more policies in a cloud computing environment. A feedback instance can include one or more targets, one or more objectives, and one or more inputs. A feedback instance can optionally include a duration, a state, a history, or a combination thereof. A target can include one or more actors to be influenced by a feedback instance. An actor can include one or more components of the feedback instance architecture 100, one or more existing feedback instances, one or more orchestrators, one or more controllers, one or more network functions, traditional routers, traditional switches, traditional firewalls, servers, computing devices, storage devices, one or more analytic modules, one or more virtual functions (e.g., virtual network functions, virtual system functions, and/or virtual application functions), and other components (not shown), and combinations thereof. An actor alternatively can include a scope of orchestration that includes operations performed by one or more components of the feedback instance architecture 100, one or more existing feedback instances, one or more orchestrators, one or more controllers, one or more network functions, one or more analytic modules, and/or other components of a cloud computing environment. An objective can include one or more goals to be achieved by a feedback instance, along with any pertinent definitions and scopes to meet the goal(s). An input can include any data to be utilized by a feedback instance to at least partially achieve an objective. A duration can include a lifespan of a feedback instance, a time-to-live ("TTL") of a feedback instance, or other similar attributes. A state can include active, dormant, and reserved states. It is contemplated that other states can be defined to accommodate other scenarios. A history can include when a feedback instance was used.

The illustrated feedback instance architecture 100 includes one or more policy requestors 102, a policy engine ("PE") 104, a policy repository 106, one or more policy enforcement points 108, a feedback instance model repository 110, one or more other repositories 112, a feedback instance resolver and creator ("FIRC") 114, a feedback instance change and upgrade resolver ("FICUR") 116, a feedback instance escalation resolver ("FIER") 118, a feedback instance consultation and interaction resolver ("FICIR") 120, a feedback instance coordination and optimization resolver ("FICOR") 122, a feedback instance mode operation monitor and selector ("FIOM/FIMOS") 124, a feedback instance orchestrator and controller ("FIOC") 126, and one or more feedback instances 128A-128N (collectively "feedback instances" 128). Each of these components and others will be described in detail below. While connections are shown between some of the components illustrated in FIG. 1, it should be understood that some, none, or all of the components illustrated in FIG. 1 can be configured to interact with one another to carry out various operations described herein. Thus, it should be understood that FIG. 1 and the following description are intended to provide a general understanding of a suitable environment in which various aspects of embodiments can be implemented, and should not be construed as being limiting in any way.

The policy requestor(s) 102 can include any entity that can utilize one or more policies. In some embodiments, the policy requestor 102 includes a component of the feedback instance architecture 100. In some other embodiments, the policy requestor 102 includes an activated feedback instance. The policy requestor 102, in other embodiments, includes a customer, a service provider, or other human or non-human entity. The policy requestor(s) 102 can generate one or more policy requests 130 directed to the PE 104. The policy request(s) 130 can be generated automatically by the policy requestor(s) 102, semi-automatically by the policy requestor(s) 130 along with input received from one or more external sources such as one or more human operators, or manually in response to input received exclusively from one or more human operators.

The PE 104 can receive data associated with one or more events (illustrated as event data 132), data associated with one or more operational inquiries (illustrated as operational inquiry data 134), and/or data associated with an active monitoring process (illustrated as active monitoring data 136). The policy requestor(s) 102 can communicate with the PE 104 to retrieve at least a portion of the event data 132, the operational inquiry data 134, the active monitoring data 136, or some combination thereof. In some embodiments, the policy requestor(s) 102 can subscribe to at least a portion of the event data 132, the operational inquiry data 134, the active monitoring data 136, or some combination thereof. The policy requestor(s) 102 can subscribe directly to the component that is the source of at least a portion of the event data 132, the operational inquiry data 134, the active monitoring data 136, or some combination thereof.

The PE 104 can receive the policy request(s) 130 from the policy requestor(s) 102 and can determine, through a policy decision process, whether to activate one or more existing policies, such as one or more policies 138A-138N (collectively "policies" 138), stored in the policy repository 106. If the PE 104 determines that at least one of the policies 138 in the policy repository 106 should be activated in response to the policy request(s) 130, the PE 104 can retrieve at least one of the policies 138 from the policy repository 106 and can instruct the policy enforcement point(s) 108 to enforce at least one of the policies 138. The policy enforcement point(s) 108 can be or can include one or more orchestrators, controllers, application servers, other servers, one or more of the feedback instances 128A-128N, combinations thereof, and the like. If, however, the PE 104 determines that none of the policies 138 in the policy repository 106 should be activated in response to the policy request(s) 130, the PE 104 can determine that a feedback instance should be utilized, at least in part, to satisfy the policy request(s) 130. The PE 104 can communicate with the FIRC 114, the FICUR 116, the FIER 118, the FICIR 120, the FICOR 122, the FIOM/FIMOS 124, the FIOC 126, or some combination thereof to utilize, at least in part, one or more of the feedback instances 128 and/or create one or more new feedback instances to satisfy the policy request(s) 130.

The PE 104 can communicate with the FIRC 114. The FIRC 114 can create one or more new feedback instance models for root cause identification of problems and policy optimization purposes. In some embodiments, the FIRC 114 can create one or more new feedback instance models, which might be based, at least in part, upon one or more model templates stored in the feedback instance model repository 110, or might be generated without any model template. The FIRC 114 can create the new feedback instance model(s) in response to a request received from the PE 104. The FIRC 114 can identify one or more intentions/objectives for the new feedback instance model. The FIRC 114 can identify one or more actors to be utilized by the new feedback instance model. The FIRC 114 can identify one or more input attributes to be collected by the new feedback instance model. The FIRC 114 can identify one or more applications that should be utilized by the new feedback instance model. The FIRC 114 also can generate a feedback instance model identifier and can associate the feedback instance model identifier with the new feedback instance model. The FIRC 114 can store the new feedback instance model and the feedback instance model identifier in a non-active feedback instance model storage 140 of the feedback instance model repository 110. Realization of feedback instance models can be handled by the FIOC 126. The FIOC 126 can retrieve the new feedback instance model created by the FIRC 114, implement the new feedback instance model, verify that the new feedback instance model creates the appropriate model results, and can activate one or more new feedback instances in production based upon the new feedback instance model.

The PE 104 can communicate with the FICUR 116. The FICUR 116 can modify the scope of one or more existing feedback instance models for root cause identification of problems and policy optimization purposes. The FICUR 116 can modify (e.g., change and/or upgrade) one or more existing feedback instance models stored in the feedback instance model repository 110 based upon one or more model extensibility policies, such as one or more of the policies 138 stored in the policy repository 106. The FICUR 116 can examine an original intention/objective of one or more existing feedback instance models and compare the original intention/objective to a modification request received from the PE 104. The FICUR 116 can extend the original intention/objective of one or more existing feedback instance models based upon one or more model extensibility policies. The FICUR 116 can add one or more attributed based upon the modified/extended original intention/objective. The FICUR 116 can utilize the same feedback instance model identifier as the original feedback instance model prior to modification. Realization of modified feedback instance models can be handled by the FIOC 126. The FIOC 126 can retrieve a modified feedback instance model created by the FICUR 116, implement the modified feedback instance model or implement the modified portion of the modified feedback instance model, verify that the modified feedback instance model creates the appropriate model results, and can activate one or more feedback instances or modify one or more feedback instances currently in production based upon the modified feedback instance model.

The PE 104 can communicate with the FIER 118. The FIER 118 can enable a dynamic process of escalating from an original feedback instance to a different feedback instance in the same domain or across different domains. The FIER 118 can convey one or more issues unresolved in one feedback instance, such as one of the feedback instances 128, to another active or non-active feedback instance. The FIER 118 can refine an existing intention/objective of the original feedback instance or can create a new intention/objective for the original feedback instance. Based upon the refined or new intention/objective, the FIER 118 can search the non-active feedback instance model storage 140 and an active feedback instance model storage 142 of the feedback instance model repository 110 to find any candidate feedback instance model(s) that can be utilized to satisfy the refined or new intention/objective. The FIER 118 can perform a distance calculation process to determine how close each candidate feedback instance model is to a model that shares the refined or new intention/objective. The FIER 118 can select the candidate with the highest distance score (i.e., closest match) and can obtain the model identifier associated with that candidate and can provide the model identifier to the FIOC 126. Realization feedback instance escalation can be handled by the FIOC 126. The FIOC 126 can retrieve the appropriate feedback instance model from the feedback instance model repository 110 using the model identifier received from the FIER 118. If the feedback instance model is in a non-active state, the FIER 118 can activate or re-activate the model for escalation.

The PE 104 can communicate with the FICIR 120. The FICIR 120 can build or extend the interaction capability between two feedback instance models to allow a requesting feedback instance model to acquire information from another feedback instance model. The FICIR 120 can enable a dynamic process through which a requesting feedback instance can issue a consultation request to another feedback instance in the same domain or across different domains. The FICIR 120 can map a consultation request to an available application programming interface ("API") published by (e.g., exposed by) one or more feedback instances. If an API is found, a method of API invocation can be recorded in the requesting feedback instance model in the active feedback instance model storage 142. If no API is found, the FICIR 120 can map the consultation request to a closest target feedback instance intention/objective. Once matched, the FICIR 120 can map the request to an event type that the target feedback instance already supports. The FICIR 120 can retrieve an event response that the target feedback instance publishes. The interaction mechanism can be recorded back to both the requesting feedback instance model and to the target feedback instance model in the active feedback instance model storage 142. Realization of feedback instance intercommunication can be handled by the FIOC 126. The FIOC 126 can retrieve the models from the feedback instance model repository 110. The FIOC 126 can then enable/upgrade an intercommunication path between the requesting feedback instance and the target feedback instance.

The PE 104 can communicate with the FICOR 122. The FICOR 122 can receive events from a group of feedback instance and can leverage one or more policies, such as one or more of the policies 138, to develop a coordinated optimization plan. Realization of the coordinated optimization plan can be handled by the FIOC 126. The FIOC 126 can interact with all participating feedback instances to execute the coordinated optimization plan.

In a feedback loop construct, a set of components can interact with each other in a deterministic manner. For example, in a feedback loop instance that involves three actors such as a controller, a policy engine, and an analytic module, the analytic module can collect events and logs from the controller; the policy engine can detect one or more anomalies; the policy engine also can subscribe to events and can deliver actionable instructions to the controller for adjustment to anomalies and/or events; and the controller can execute the action(s) and can log the result in a log entity. This pattern can be repeated continuously until the feedback instance is deactivated. This deterministic mechanism fails to support additional flexibility and/or efficiency of how the entire feedback instance should be executed based on various conditions, especially the level of participation/contribution from an external policy engine in a given runtime condition.

The PE 104 can communicate with the FIOM/FIMOS 124. The FIOM/FIMOS 124 can coordinate adjustment and execution of policy participation level mode ("PPLM") based upon current feedback instance conditions. Based on traffic conditions, computing or network resource conditions, energy conditions and priority considerations, explicit involvement of policy can be automatically or manually tuned/adjusted to a suitable mode. A "mode," as used herein, can represent a degree or level of guidance, constraints, required interactions, and/or the like provided by a policy. Alternately, or more generally, modes may reflect different (alternative, in any respect) policy guidance, constraints, required interactions, and/or the like.

Figure 2A:
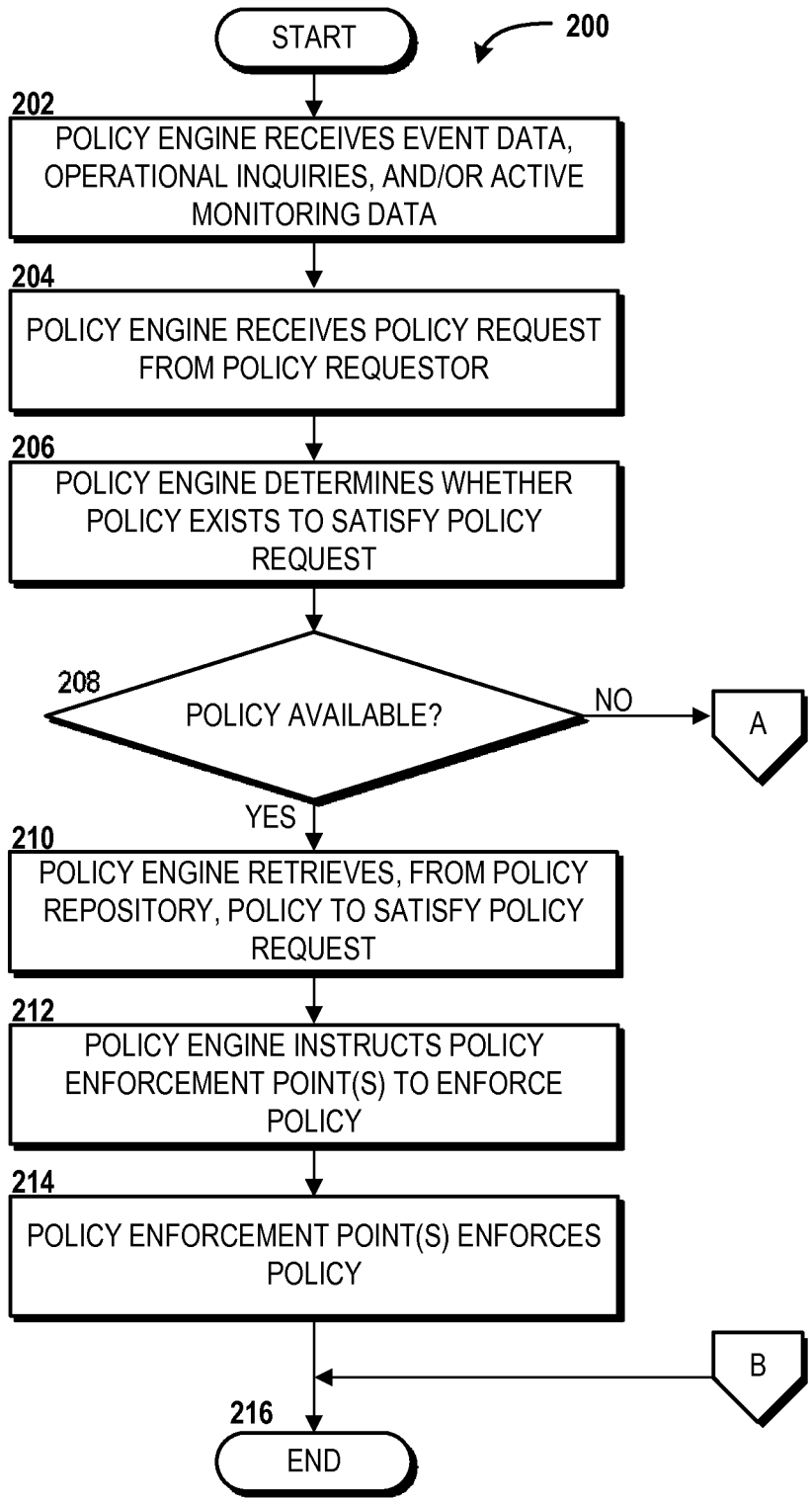
FIGS. 2A-2B are flow diagrams illustrating aspects of a method for operating the feedback instance architecture, according to an illustrative embodiment.
Figure 2B:
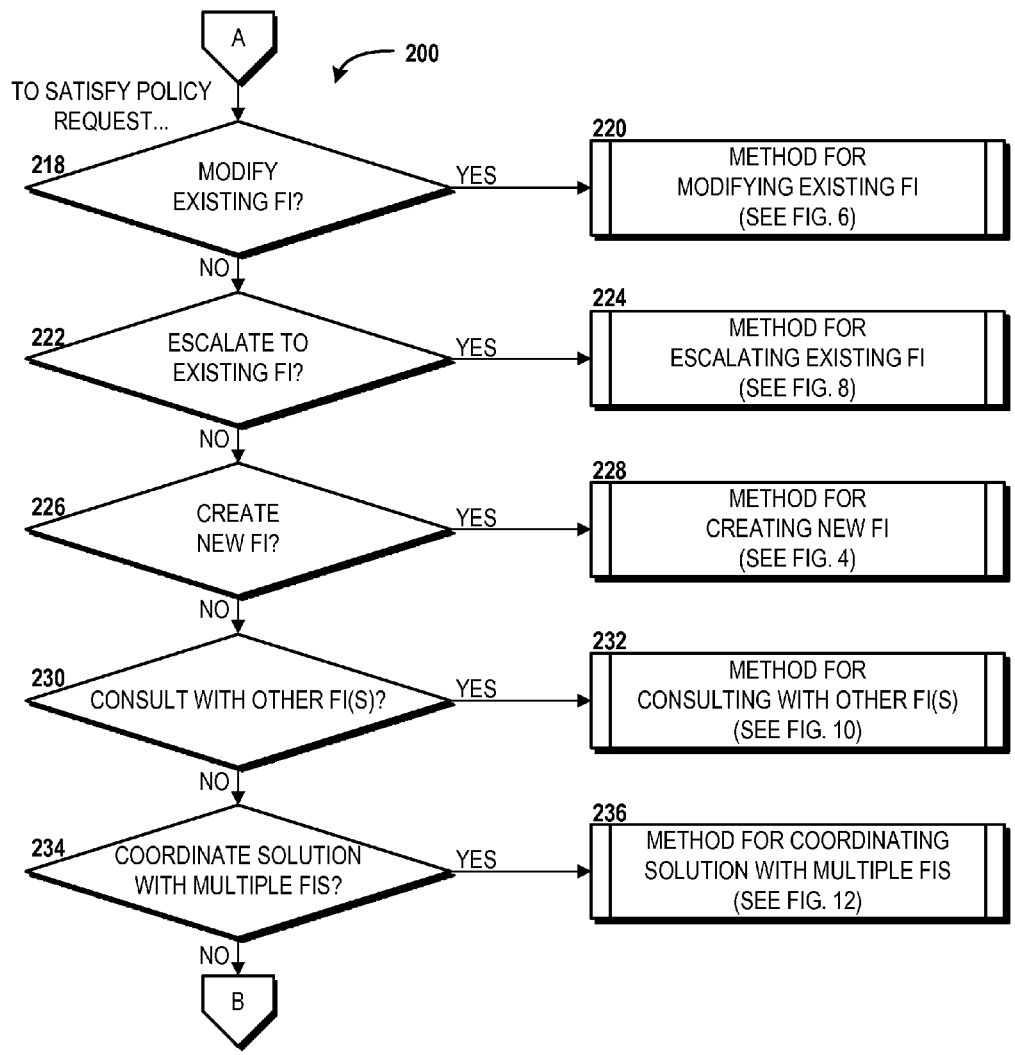

Turning now to FIGS. 2A-2B, aspects of a method 200 for operating the feedback instance architecture will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor, a processor one or more computing systems, devices, engines, switches, routers, or components disclosed herein to perform operations. It should be understood that the performance of one or more operations may include operations executed by one or more virtual processors at the instructions of one or more of the aforementioned hardware processors.

The method 200 will be described with reference to FIGS. 2A-2B and further reference to FIG. 1. The method 200 begins at operation 202, where the PE 104 receives at least a portion of the event data 132, the operational inquiry data 134, and/or the active monitoring data 136. From operation 202, the method 200 proceeds to operation 204, where the PE 104 receives the policy request 130 from the policy requestor 102.

From operation 204, the method 200 proceeds to operation 206, where the PE 104 determines whether one or more policies exist, such as one or more of the policies 138 stored in the policy repository 106, that can be utilized to satisfy the policy request 130. If, at operation 208, one or more policies are available, the method 200 proceeds to operation 210, where the PE 104 retrieves, from the policy repository 106, the one or more policies to satisfy the policy request 130. From operation 210, the method 200 proceeds to operation 212, where the PE 104 instructs one or more of the policy enforcement points 108 to enforce the one or more policies. As described above, the policy enforcement point(s) 108 can be or can include one or more orchestrators, controllers, application servers, other servers, one or more of the feedback instances 128A-128N, combinations thereof, and the like. From operation 212, the method 200 proceeds to operation 214, where the policy enforcement point(s) 108 enforce the one or more policies. From operation 214, the method 200 proceeds to operation 216. The method 200 ends at operation 216.

If, at operation 208, one or more policies are not available, the method 200 proceeds to operation 218 shown in FIG. 2B. At operation 218, the PE 104 determines whether one or more existing feedback instances should be modified by the FICUR 116 to satisfy the policy request 130. If so, the method 200 proceeds to operation 220, which represents a method performed, at least in part, by the FICUR 116 to modify one or more existing feedback instances as illustrated and described with reference to FIG. 6. If not, the method 200 proceeds to operation 222.

One non-limiting example of the method for modifying an existing feedback instance model will now be described. In this example, a feedback instance is utilized to monitor one or more anomalies of a set of home devices and related virtual network functions ("VNFs") associated with the set of home devices in a network. The actors of the feedback instance can include the physical home devices, an access control server for the physical home devices, the VNFs associated with the physical home devices, a virtual function controller, an analytics module, and the PE 104. In this example, the feedback instance can focus on Internet traffic performance. A few anomalies are detected which imply unusual video pattern to clog an access network. The attributes being collected did not include over the top video program usage parameters. Therefore, the normal way to deal with the issue is to publish a video congestion event to a trouble ticket system which must be accomplished via a manual intervention process. However, using the feedback instance, the PE 104 can automatically determine to extend the data collection scope with the inclusion of over-the-top usage parameters. The automation of the PE 104 further determines to add a video pattern analytic module to the feedback instance, since the PEs 104 inputs seem to indicate this need, which justifies the additional feedback loop extent and effort. Thus, the feedback instance can be modified to take on the new task with no manual intervention.

At operation 222, the PE 104 determines whether the policy request 130 should be escalated to an existing feedback instance. If so, the method 200 proceeds to operation 224, which represents a method performed, at least in part, by the FIER 118, to escalate an existing feedback instance as illustrated and described with reference to FIG. 8. If not, the method 200 proceeds to operation 226.

One non-limiting example for escalating to an existing feedback instance will now be described. In this example, an original feedback instance involves three actors, namely a software-defined network ("SDN") controller, the PE 104, and an analytics module. The original feedback instance can enable the analytics module to identify one or more anomalies. The original feedback instance also can enable the PE 104 to recommend one or more mitigation rules. The original feedback instance also can instruct the SDN controller to execute the mitigation rule(s). In this example, an anomaly is identified but the PE 104 determines that the scope of the resolution or needed actions might be beyond what the feedback instance can handle. The possible fixes for this scenario are to either modify the existing feedback instance (such as by utilizing the method for modifying the feedback instance briefly described above and in further detail herein below) or to escalate to another feedback instance to handle the anomaly. The PE 104 can locate the other feedback instance to perform the escalation process. In this example, the other feedback instance can involve four actors, including the SDN controller, the PE 104, and the analytics module of the feedback instance. The fourth actor can be an orchestrator that has the capability of performing cross-domain validation. For example, in this scenario to compare the anomaly to one or more similar patterns in another region. If the pattern matches to what is known in another region, the orchestrator can facilitate a signature migration process to the original feedback instance. If, however, the pattern does not match, a new signature should be created for future references in the original feedback instance. After the escalation process satisfactorily completes, control may be passed back to the original feedback instance.

At operation 226, the PE 104 determines whether a new feedback instance should be created to satisfy the policy request 130. If so, the method 200 proceeds to operation 228, which represents a method performed, at least in part, by the FIRC 114, to create a new feedback instance model upon which the new feedback instance can be based as illustrated and described with reference to FIG. 4. If not, the method 200 proceeds to operation 230.

One non-limiting example of the method for creating a new feedback instance model will now be described. In this example, a first feedback instance can monitor layer 3 network traffic patterns. The first feedback instance can include a physical router (e.g., a CISCO brand router), a virtual router, and the PE 104 as actors. Data attributes can be collected and documented in a feedback instance model template stored in the feedback instance model repository 110. The model template can provide one layer of abstraction so that future physical router/virtual router of different brands can reuse the model template in certain way. Installation personnel can install a set of other routers (e.g., JUNIPER brand routers). In this example, the personnel does not have time to retool the model template and create new feedback instance(s) particular to the JUNIPER routers. After installation of the JUNIPER routers, network operations personnel can issue a request to monitor slow network response time. The PE 104 might fail to locate an active or inactive feedback instance to take on the request to monitor slow network response time and, in response, can determine to create a new feedback instance ("second feedback instance"). The PE 104 can leverage the existing model template for the first feedback instance but can readjust the involved actors and dynamically creates the second feedback instance in the FI model repository 110. The FIOC 126 can realize/instantiate the second feedback instance in runtime. Analysis from the second feedback instance can then be passed back to the network operations personnel. The second feedback instance can continue to operate.

At operation 230, the PE 104 determines whether the PE 104 should consult with one or more other feedback instances to satisfy the policy request 130. If so, the method 200 proceeds to operation 232, which represents a method performed, at least in part, by the FICIR 120 to enable intercommunication among feedback instances to satisfy the policy request 130 as illustrated and described with reference to FIG. 10. If not, the method 200 proceeds to operation 234.

One non-limiting example of the method for a first feedback instance to consult with a second feedback instance will be described. In this example, the first feedback instance can monitor virtual machine ("VM") usage. The first feedback instance can detect heavy application usages for a set of VMs. Under normal operation, the first feedback instance can expand VM instances on the same hardware or relocate VMs to new hardware. Although users will not notice the difference, the network processors will be tied up for a time, which might slow down other maintenance related activities. In order to ensure the anomaly should be handled in this manner, the first feedback instance can consult with the PE 104 for further instruction. The PE 104 can suggest a consultation request to a second feedback instance, which includes an application controller, one or more VNFs, an analytics module, and the PE 104. The second feedback instance can response with the message "Demand for Application #1-Application #N will soon reduce by a factor of 80% in 15 minutes." As a result of this consultation, the first feedback instance can determine to only migrate a small set of VMs to a new hardware and leave the rest intact.

At operation 234, the PE 104 determines whether the PE 104 should coordinate a solution via an optimization plan that involves multiple feedback instances. If so, the method 200 proceeds to operation 236, which represents a method performed, at least in part, by the FIOM/FIMOS 124 to coordinate a solution via an optimization plan that involves multiple feedback instances as illustrated and described with reference to FIG. 12. If not, the method 200 proceeds to operation 216 shown in FIG. 2A. The method 200 ends at operation 216. Alternatively, the PE 104 may issue an error or other notification to suggest that the policy request 130 cannot currently be satisfied, in response to which an operator or other entity can intervene.

One non-limiting example of the method for coordinating a solution among feedback instances will be described. In this example, a first feedback instance for VM usage management can include three actors, namely an orchestrator, a cloud resource controller, and a PE 104. The first feedback instance can be used to detect VM usage issues. In this example scenario, an anomaly was detected that an event is ready to be published to create new VMs to ease off the capacity glitches. However, this scenario is happening at an unusual time period (e.g., at 4:30 PM which normally would be a time for the traffic to go down, not up). The PE 104 can make a dynamic decision to coordinate with a second feedback instance focused on security to coordinate with the first feedback instance to monitor the situation. The second feedback instance can detect a Denial of Service ("DNS") attack. Instead of creating new VM instances via the first feedback instance, the security threats can instead be mitigated via the second feedback instance.

Figure 3:
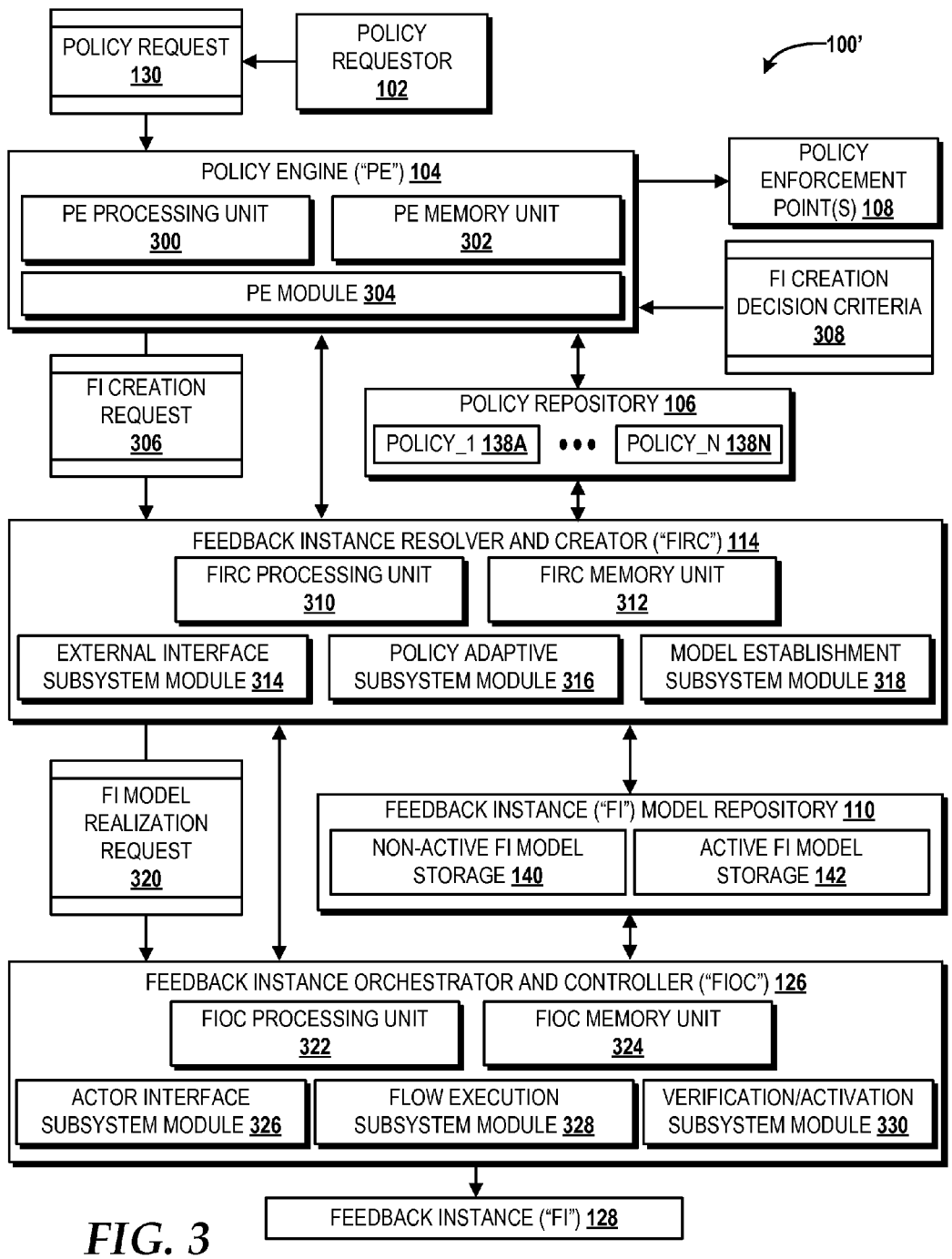
FIG. 3 is a block diagram illustrating further aspects of the feedback instance architecture, according to an illustrative embodiment.

Turning now to FIG. 3, a block diagram illustrating further aspects of the feedback instance architecture 100' will be described, according to an embodiment. The illustrated feedback instance architecture 100' includes the policy requestor 102, the PE 104, the policy repository 106, the FIRC 114, the feedback instance model repository 110, and the FIOC 126. Each of these components and others will be described in detail below. While connections are shown between some of the components illustrated in FIG. 3, it should be understood that some, none, or all of the components illustrated in FIG. 3 can be configured to interact with one another to carry out various operations described herein. Thus, it should be understood that FIG. 3 and the following description are intended to provide a general understanding of a suitable environment in which various aspects of embodiments can be implemented, and should not be construed as being limiting in any way.

The policy requestor 102 can generate the policy request 130 directed to the PE 104. The PE 104 can receive the policy request 130 from the policy requestor 102 and can determine, through a policy decision process, whether or not a policy exists that can be utilized to satisfy the policy request 130. If so, the PE 104 can activate the policy and can instruct the policy enforcement point(s) 108 to enforce the policy.

The illustrated PE 104 includes a PE processing unit 300, a PE memory unit 302, and a PE module 304. The PE processing unit 300 can be or can include one or more central processing units ("CPUs") configured with one or more processing cores. The PE processing unit 300 can be or can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the PE processing unit 300 can be or can include one or more discrete GPUs. In some other embodiments, the PE processing unit 300 can be or can include CPU and GPU components that are configured in accordance with a co-processing CPU/GPU computing model, wherein the sequential part of an application executes on the CPU and the computationally-intensive part is accelerated by the GPU. The PE processing unit 300 can be or can include one or more field-programmable gate arrays ("FPGAs"). The PE processing unit 300 can be or can include one or more system-on-chip ("SoC") components along with one or more other components, including, for example, the PE memory unit 302. In some embodiments, the PE processing unit 300 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The PE processing unit 300 can be or can include one or more hardware components architected in accordance with an ARM architecture, available for license from ARM HOLDINGS of Cambridge, United Kingdom. Alternatively, PE processing unit 300 can be or can include one or more hardware components architected in accordance with an x86 architecture, such an architecture available from INTEL CORPORATION of Mountain View, Calif., and others. Those skilled in the art will appreciate the implementation of the PE processing unit 300 can utilize various computation architectures, and as such, the PE processing unit 300 should not be construed as being limited to any particular computation architecture or combination of computation architectures, including those explicitly disclosed herein.

The PE memory unit 302 can be or can include one or more hardware components that perform storage operations, including temporary and/or permanent storage operations. In some embodiments, the PE memory unit 302 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the PE processing unit 300. The PE module 304 can be stored in the PE memory unit 302.

The PE module 304 can be executed by the PE processing unit 300 to perform operations in response to the policy request 130. More particularly, the PE module 304 can execute operations of a policy decision process through which the PE module 304 determines whether to activate one or more existing policies, such as one or more of the policies 138, stored in the policy repository 106. If the PE module 304 determines that at least one of the policies 138 in the policy repository 106 should be activated in response to the policy request 130, the PE module 304 can retrieve the one or more policies 138 from the policy repository 106 and can instruct the policy enforcement point(s) 108 to enforce the one or more policies 138. If, however, the PE module 304 determines that none of the policies 138 in the policy repository 106 should be activated in response to the policy request 130, the PE module 304 can determine that a feedback instance should be created to satisfy the policy request 130, and so can generate a feedback instance creation request 306 directed to the FIRC 114.

The PE 104 can generate the feedback instance creation request 306 based, at least in part, upon feedback instance creation decision criteria 308. The feedback instance creation decision criteria 308 can include one or more targets, one or more intentions/objectives, one or more inputs, and/or one or more operational attributes such as duration and/or state. The PE 104 can examine the policy request 130 and the initial policy decision to generate the feedback instance creation decision criteria 308. For instance, the PE 104 can define the objective(s) for a feedback instance. The PE 104 also can define the target(s), the input(s), and the operational attribute(s).

The illustrated FIRC 114 includes an FIRC processing unit 310, an FIRC memory unit 312, an external interface subsystem ("EIS") module 314, a policy adaptive subsystem ("PAS") module 316, and a model establishment subsystem ("MES") module 318. The EIS module 314, the PAS module 316, and the MES module 318 can be stored in the FIRC memory unit 312 and can be executed by the FIRC processing unit 310 to cause the FIRC 114 to perform operations to create feedback instance models in accordance with embodiments disclosed herein.

The FIRC processing unit 310 can be or can include one or more CPUs configured with one or more processing cores. The FIRC processing unit 310 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FIRC processing unit 310 can be or can include one or more discrete GPUs. In some other embodiments, the FIRC processing unit 310 can be or can include CPU and GPU components that are configured in accordance with a co-processing CPU/GPU computing model, wherein the sequential part of an application executes on the CPU and the computationally-intensive part is accelerated by the GPU. The FIRC processing unit 310 can be or can include one or more FPGAs. The FIRC processing unit 310 can be or can include one or more SoC components along with one or more other components, including, for example, the FIRC memory unit 312. In some embodiments, the FIRC processing unit 310 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FIRC processing unit 310 can be or can include one or more hardware components architected in accordance with an ARM architecture, available for license from ARM HOLDINGS of Cambridge, United Kingdom. Alternatively, the FIRC processing unit 310 can be or can include one or more hardware components architected in accordance with an x86 architecture, such an architecture available from INTEL CORPORATION of Mountain View, Calif., and others. Those skilled in the art will appreciate the implementation of the FIRC processing unit 310 can utilize various computation architectures, and as such, the FIRC processing unit 310 should not be construed as being limited to any particular computation architecture or combination of computation architectures, including those explicitly disclosed herein.

The FIRC memory unit 312 can be or can include one or more hardware components that perform storage operations, including temporary and/or permanent storage operations. In some embodiments, the FIRC memory unit 312 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FIRC processing unit 310.

The EIS module 314 can receive and examine feedback instance creation requests, such as the illustrated feedback instance creation request 306 received from the PE 104. The EIS module 314 can receive and examine other feedback instance creation requests from other participating actors. The EIS module 314 can provide a feedback instance model realization request 320 to the FIOC 126.

The PAS module 316 can examine the feedback instance creation request 306 using one or more policy rules to define one or more objectives for a new feedback instance model. The PAS module 316 can then use the defined model objective(s) to derive one or more model target actors, one or more model input attributes as well as associated real-time feedback instance establishment and operation visualization attributes/policies. Real-time feedback instance establishment and operation visualization attributes/policies can indicate, influence, or control various aspects of establishment and visualization. Policy criteria (as attributes) can be defined under what conditions a particular feedback instance can be activated. Examples of these attributes include, but are not limited, location, time of day, the intended uses (e.g., organization or security), and computing resource constraints of involved actors. Each of the feedback instances can then be visualized by network/system operation personnel. Attributes in this regard can include, but are not limited to, the operation organization, security level, real-time update frequency (e.g., every second, every minute, on-demand,), drill down level, history log duration, and the like. The MES module 318 can create a new feedback instance model based upon output of the PAS module 316 and can provide the new feedback instance model along with an associated model identifier to the feedback instance model repository 110 for storage as a non-active feedback instance model in the non-active feedback instance model storage 140 of the feedback instance model repository 110. Upon or after activation of one or more new feedback instances based upon the new feedback instance model, the model identifier of the new feedback instance model can be moved to the active feedback instance model storage 142 of the feedback instance model repository 110.

The FIRC 114, in some embodiments, is implemented as a policy application executable by the PE processing unit 300 of the PE 104. In other embodiments, such as the illustrated embodiment, the FIRC 114 is implemented as an external entity that is in communication with the PE 104 to support the creation of feedback instance models. A new feedback instance model creation request, such as the feedback instance creation request 306, can be received from the PE 104, although in some embodiments, the FIRC 114 can subscribe to requests directly from an actor external to the PE 104.

The illustrated FIOC 126 is located downstream from the FIRC 114 in the illustrated feedback instance architecture 100. The FIOC 126 can respond to the feedback instance model realization request 320 received from the FIRC 114 to realize—that is, to put into production—the feedback instance model identified in the feedback instance model realization request 320. The FIOC 126 can function as a supporting entity to the FIRC 114. In some embodiments, the functionality of the FIOC 126 is combined with the functionality of the FIRC 114. In other embodiments, such as the illustrated embodiment, the FIOC 126 is implemented as an external entity that is in communication with the FIRC 114.

The illustrated FIOC 126 includes an FIOC processing unit 322, an FIOC memory unit 324, an actor interface subsystem ("AIS") module 326, a flow execution subsystem ("FES") module 328, and a verification and activation subsystem ("VAS") module 330. The AIS module 326, the FES module 328, and the VAS module 330 can be stored in the FIOC memory unit 324 and can be executed by the FIOC processing unit 322 to cause the FIOC 126 to perform operations described herein.

The FIOC processing unit 322 can be or can include one or more CPUs configured with one or more processing cores. The FIOC processing unit 322 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FIOC processing unit 322 can be or can include one or more discrete GPUs. In some other embodiments, the FIOC processing unit 322 can be or can include CPU and GPU components that are configured in accordance with a co-processing CPU/GPU computing model, wherein the sequential part of an application executes on the CPU and the computationally-intensive part is accelerated by the GPU. The FIOC processing unit 322 can be or can include one or more FPGAs. The FIOC processing unit 322 can be or can include one or more SoC components along with one or more other components, including, for example, the FIOC memory unit 324. In some embodiments, the FIOC processing unit 322 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FIOC processing unit 322 can be or can include one or more hardware components architected in accordance with an ARM architecture, available for license from ARM HOLDINGS of Cambridge, United Kingdom. Alternatively, the FIOC processing unit 322 can be or can include one or more hardware components architected in accordance with an x86 architecture, such an architecture available from INTEL CORPORATION of Mountain View, Calif., and others. Those skilled in the art will appreciate the implementation of the FIOC processing unit 322 can utilize various computation architectures, and as such, the FIOC processing unit 322 should not be construed as being limited to any particular computation architecture or combination of computation architectures, including those explicitly disclosed herein.

The FIOC memory unit 324 can be or can include one or more hardware components that perform storage operations, including temporary and/or permanent storage operations. In some embodiments, the FIOC memory unit 324 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FIOC processing unit 322.

The AIS module 326 can receive the feedback instance model realization request 320 from the FIRC 114. The AIS module 326 can retrieve a feedback instance model from the non-active feedback instance model storage 140 stored in the feedback instance model repository 110 in accordance with a model identifier supplied in the feedback instance model realization request 320. The AIS module 326 can interact with one or more actors defined in the feedback instance model to realize one or more of the feedback instances 128.

The FES module 328 can decompose a feedback instance model retrieved from the feedback instance model repository 110 and can direct the AIS module 326 in an operation-by-operation manner to realize the model. Realizing the model can include instantiating the model for a particular feedback instance. Some operations for realizing the model can include, but are not limited to, (1) examine identified analytic module instance and then configure data collection algorithm to be used and event publication rules; (2) examine all other actors (e.g., one actor at a time) to configure needed policies/rules to each actor to make the feedback instance complete; and (3) after operation (2), the feedback instance is created but still in an inactive mode until the feedback instance passes a verification process.

One operation in the flow can be enabling of one or more visualization policies so that the feedback instance 128 can be visually observed by operations personnel. When a feedback instance is activated, the feedback instance can operate as a standalone feedback instance continuously. However, every feedback instance can be managed so that operations personnel can visualize the current condition of the feedback instance and the associated status of the feedback instance. Visualization policies can be defined to identify who can view this information, how frequently the information can be used to update the monitoring dashboard, and how many levels the policy allows operation personnel to drill down to view finer grain details.

The VAS module 330 can perform one or more verification operations before activating the feedback instance 128 in a production mode. For example, verification operations (prior to activation of the feedback instance) can include, but are not limited to, conflict detection, various heuristic and/or algorithmic validation checks, governance checks, and the like. Operation groups such as network operation center ("NOC"), information technology ("IT") operation personnel, Internet operation center ("IOC"), and others might have an interest in verifying that the feedback instance is acceptable. Additional verification operations might be to ensure all participating actors are up and running, to ensure all activation policies are met (e.g., time of day, security level, location, and the like), and to ensure no conflicting feedback instance(s) is/are present. The VAS module 330 also can perform one or more activation operations to activate the feedback instance 128 in the production mode.

The FIOC 126 can be implemented as an orchestration application within a service and/or resource orchestrator or can be implemented as an external entity in communication with such an orchestrator. When the FIOC 126 is implemented as an external entity to the orchestrator, the FIOC 126 can leverage the existing interface infrastructure of the orchestrator.

Figure 4:
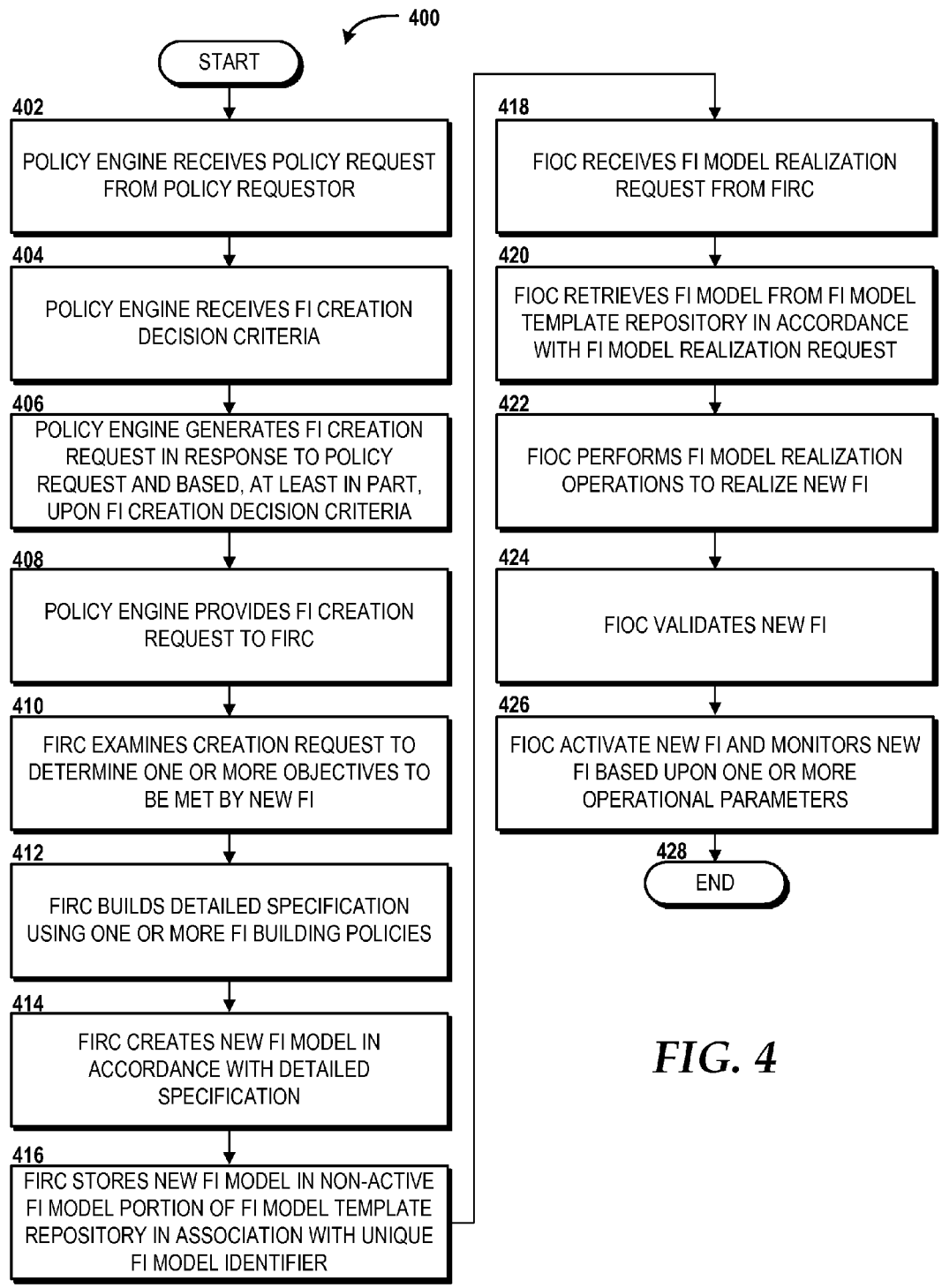
FIG. 4 is a flow diagram illustrating aspects of a method for creating and managing feedback instances in the feedback instance architecture, according to an illustrative embodiment of the concepts and technologies disclosed herein.

Turning now to FIG. 4, aspects of a method 400 for creating and managing feedback instances in the feedback instance architecture 100' will be described, according to an illustrative embodiment. The method 400 begins at operation 402, where the PE 104 receives the policy request 130 from the policy requestor 102. From operation 402, the method 400 proceeds to operation 404, where the PE 104 receives the feedback instance creation decision criteria 308. From operation 404, the method 400 proceeds to operation 406, where the PE 104 generates the feedback instance creation request 306 in response to the policy request 130 and based, at least in part, upon the feedback instance creation decision criteria 308. From operation 406, the method 400 proceeds to operation 408, where the PE 104 provides the feedback instance creation request 306 to the FIRC 114.

From operation 408, the method 400 proceeds to operation 410, where the FIRC 114 examines the feedback instance creation request 306 to determine one or more objectives to be met by a new feedback instance model. From operation 410, the method 400 proceeds to operation 412, where the FIRC 114 builds a detailed specification for the new feedback instance model using one or more feedback instance building policies. Feedback instance building policies can include any useful and various conditional policies that will help enable the construction of feedback instances. For example, for a particular security related feedback, the feedback instance might have to include one of the security related tools such as virus detection function, denial of service ("DoS") attack module, deep packet inspection ("DPI"), and this can be indicated and enforced via a building policy. For a cloud resource feedback instance, a building policy can include a cloud controller and research orchestrator in the building policies. The building policies can suggest a minimal set of actors to form the feedback instance. There will be additional rules to suggest in what situation additional actors may need to participate. The FIRC 114 can use the requested "content" to match the intent. Once the intent is matched, the FIRC 114 can look into a building policy repository (as part of the other repositories 112 to select the most suitable building policy/policies to be used as the blueprint for constructing the feedback instance.

From operation 412, the method 400 proceeds to operation 414, where the FIRC 114 creates a new feedback instance model in accordance with the detailed specification built at operation 412. From operation 414, the method 400 proceeds to operation 416, where the FIRC 114 stores the new feedback instance model in the non-active feedback instance model storage 140 of the feedback instance model repository 110 in association with a unique feedback instance model identifier that identifies the new feedback instance model for later retrieval.

From operation 416, the method 400 proceeds to operation 418, where the FIOC 126 receives the feedback instance model realization request 320 from the FIRC 114. From operation 418, the method 400 proceeds to operation 420, where the FIOC 126 retrieves the new feedback instance model from the feedback instance model repository 110 using the unique feedback instance model identifier received in the feedback instance model realization request 320. From operation 420, the method 400 proceeds to operation 422, where the FIOC 126 performs feedback instance model realization operations to realize a new feedback instance, such as the feedback instance 128, based upon the new feedback instance model. From operation 422, the method 400 proceeds to operation 424, where the FIOC 126 verifies the new feedback instance. From operation 424, the method 400 proceeds to operation 426, where the FIOC 126 activates the new feedback instance to put the new feedback instance into production and monitors the new feedback instance based upon one or more operational parameters. Operational parameters can include monitoring details and any other factors or considerations useful in day-to-day operations of feedback instances. The operational parameters can include, but are not limited to, when the feedback instance can be running, any location limitations or other limitations or constraints that might apply, which operational organizations can visually or otherwise see and monitor these feedback instances, who can suspend and resume these feedback instances, under what conditions the feedback instance should pause operation and request intervention, and the like.

From operation 426, the method 400 proceeds to operation 428. The method 400 ends at operation 428.

Figure 5:
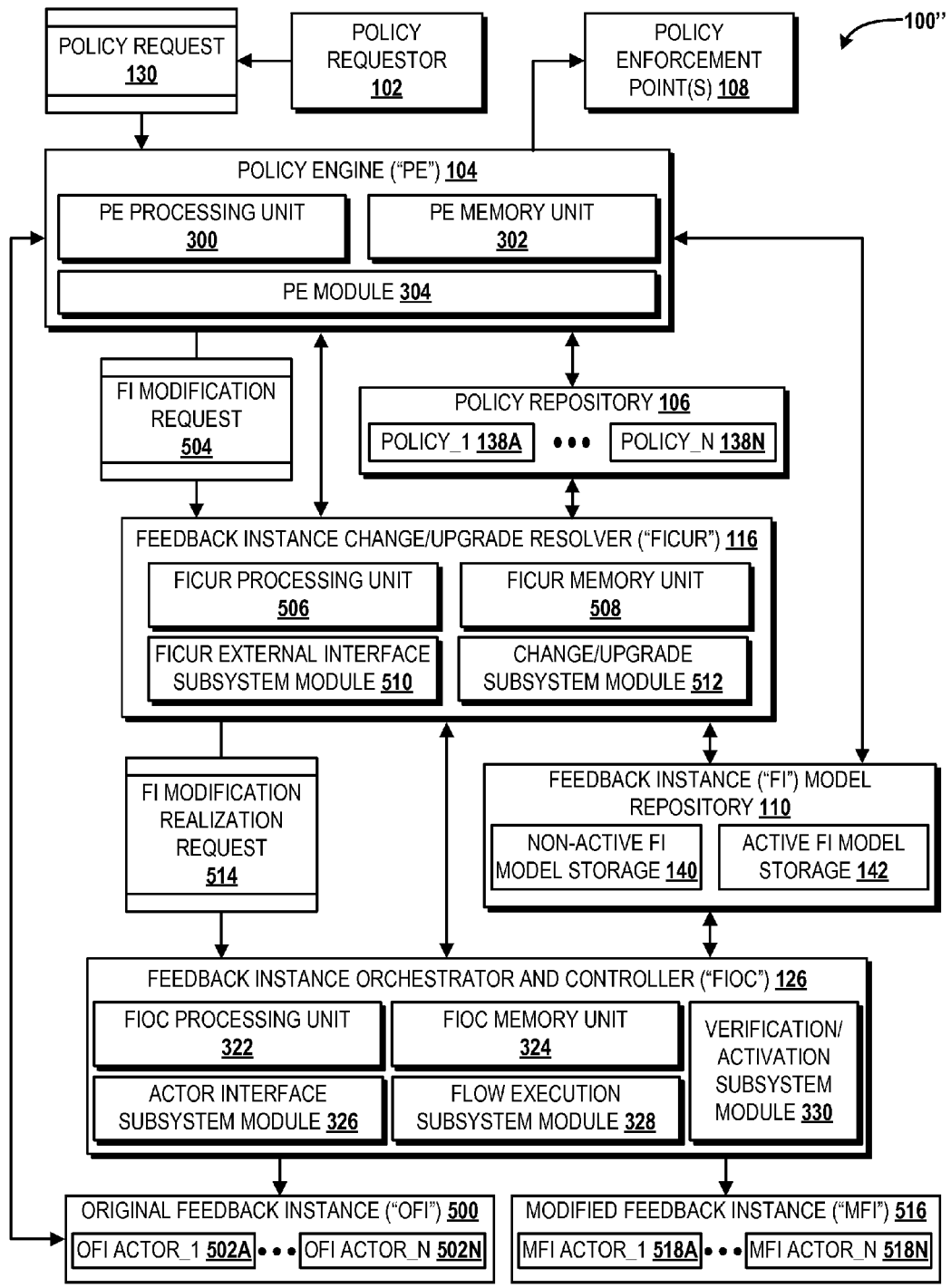
FIG. 5 is a block diagram illustrating further aspects of the feedback instance architecture, according to an illustrative embodiment.

Turning now to FIG. 5, a block diagram illustrating further aspects of the feedback instance architecture 100" will be described, according to an illustrative embodiment. The illustrated feedback instance architecture 100 includes the policy requestor 102, the PE 104, the policy repository 106, the FICUR 116, the feedback instance model repository 110, and the FIOC 126. Each of these components and others will be described in detail below. While connections are shown between some of the components illustrated in FIG. 5, it should be understood that some, none, or all of the components illustrated in FIG. 5 can be configured to interact with one another to carry out various operations described herein. Thus, it should be understood that FIG. 5 and the following description are intended to provide a general understanding of a suitable environment in which various aspects of embodiments can be implemented, and should not be construed as being limiting in any way.

The PE 104 can receive the policy request 130 from the policy requestor 102 and can determine, through a policy decision process, whether or not a policy exists that can be utilized to satisfy the policy request 130. If so, the PE 104 can activate the policy and can instruct one or more policy enforcement points 108 to enforce the policy.

The illustrated PE 104 includes the PE processing unit 300, the PE memory unit 302, and the PE module 304 described above with reference to FIG. 3. The PE module 304 can be executed by the PE processing unit 300 to perform operations in response to the policy request 130. More particularly, the PE module 304 can execute operations of a policy decision process through which the PE module 304 determines whether to activate one or more existing policies, such as one or more of the policies 138 stored in the policy repository 106. If the PE module 304 determines that at least one of the policies 138 in the policy repository 106 should be activated in response to the policy request 130, the PE module 304 can retrieve one or more of the policies 138 from the policy repository 106 and can instruct the policy enforcement point(s) 108 to enforce the one or more policies 138. If, however, the PE module 304 determines that none of the policies 138 in the policy repository 106 should be activated in response to the policy request 130, the PE module 304 can determine whether an existing, active feedback instance, such as an original feedback instance 500, can be utilized to satisfy the policy request 130. If an existing, active feedback instance can be utilized to satisfy the policy request 130, the PE 104 can associate that existing, active feedback instance with the policy request 130. For example, if the PE 104 determines that the original feedback instance 500 can be utilized to satisfy the policy request 130, the PE 104 can associate the original feedback instance 500 with the policy request 130.

If, however, the original feedback instance 500 cannot be utilized to satisfy the policy request 130, the PE 104 can identify one or more deficiencies in the original feedback instance 500 that can be cured via a modification process disclosed herein.

The illustrated original feedback instance 500 includes a plurality of original feedback instance actors (illustrated as OFI actor_1-OFI actor_N) 502A-502N, although the original feedback instance 500 might include a different number of actors. As used herein, the term "original" with regard to a feedback instance refers to an existing, active feedback instance prior to any modifications. Moreover, it should be understood that a modified feedback instance can be further modified to accommodate additional policy requests and can be modified to revert back to a previous state. For example, the original feedback instance 500 can be modified to add a new actor in response to the policy request 130 and later can be modified to remove the new actor to revert back to a state indicative of the original feedback instance 500.

The original feedback instance 500 might be deficient in one or more aspects. The original feedback instance 500 might be deficient in a number of actors and/or type of actor. In some embodiments, the original feedback instance 500 includes a particular actor but can be deficient in that the particular actor is inactive. Alternatively, in other embodiments, the original feedback instance 500 does not include an actor and, in this manner, is deficient. The original feedback instance 500 might be deficient in a number of inputs and/or type of inputs. The original feedback instance 500 might be deficient in a type or number of operational parameters and/or values associated therewith. The original feedback instance 500 might be deficient in one or more applications (e.g., analytics application(s)), and might benefit from or require the addition of one or more applications and/or the removal of one or more applications to cure a deficiency. The original feedback instance 500 might need changes to other attributes such as, but not limited, to capacity, traffic, and the like.

The PE 104 can generate a feedback instance modification request 504 directed to the FICUR 116 to notify the FICUR 116 of one or more deficiencies in the original feedback instance 500. The illustrated FICUR 116 includes an FICUR processing unit 506, an FICUR memory unit 508, an FICUR EIS module 510, and a change/upgrade subsystem ("CUS") module 512. The FICUR EIS module 510 and the CUS module 512 can be stored in the FICUR memory unit 508 and can be executed by the FICUR processing unit 506 to cause the FICUR 116 to perform operations to modify feedback instances in accordance with embodiments disclosed herein.

The FICUR processing unit 506 can be or can include one or more CPUs configured with one or more processing cores. The FICUR processing unit 506 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FICUR processing unit 506 can be or can include one or more discrete GPUs. In some other embodiments, the FICUR processing unit 506 can be or can include CPU and GPU components that are configured in accordance with a co-processing CPU/GPU computing model, wherein the sequential part of an application executes on the CPU and the computationally-intensive part is accelerated by the GPU. The FICUR processing unit 506 can be or can include one or more FPGAs. The FICUR processing unit 506 can be or can include one or more SoC components along with one or more other components, including, for example, the FICUR memory unit 508. In some embodiments, the FICUR processing unit 506 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FICUR processing unit 506 can be or can include one or more hardware components architected in accordance with an ARM architecture, available for license from ARM HOLDINGS of Cambridge, United Kingdom. Alternatively, the FICUR processing unit 506 can be or can include one or more hardware components architected in accordance with an x86 architecture, such an architecture available from INTEL CORPORATION of Mountain View, Calif., and others. Those skilled in the art will appreciate the implementation of the FICUR processing unit 506 can utilize various computation architectures, and as such, the FICUR processing unit 506 should not be construed as being limited to any particular computation architecture or combination of computation architectures, including those explicitly disclosed herein.

The FICUR memory unit 508 can be or can include one or more hardware components that perform storage operations, including temporary and/or permanent storage operations. In some embodiments, the FICUR memory unit 508 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FICUR processing unit 506.

The FICUR EIS module 510 can receive and examine feedback instance modification requests, such as the illustrated feedback instance modification request 504 received from the PE 104. The FICUR EIS module 510 can receive and examine other feedback instance modification requests from other participating actors. The majority of feedback instance modification requests will likely come from the PE 104. However, in some cases, participating actors can also contribute to the request process. For example, in a scale up feedback instance, a resource controller might signal the FICUR EIS module 510 that the VM spin-off process might become too frequent and certain thresholds might need to be readjusted without needing to modify the entire feedback instance. In this case, FICUR may decide to make some modification of configuration parameters while keeping the feedback instance running. The FICUR EIS module 510 can provide a feedback instance modification realization request 514 to the FIOC 126 so that the FIOC 126 can execute one or more operations to upgrade or change the original feedback instance 500.

The CUS module 512 can examine the feedback instance modification request 504 using one or more policy rules to modify one or more model objectives of the feedback instance model upon which the original feedback instance 500 is based. The CUS module 512 can then utilize the modified model objective(s) to modify a specification associated with the feedback instance model to create a modified feedback instance model. Modification to the specification can add or reduce model target actors, model input attributes, associated operation(s), and/or visualization attributes/policies. The CUS module 512 can provide the modified feedback instance model and the associated modified specification along with a model identifier to the feedback instance model repository 110. The CUS module 512 can store the modified feedback instance model in the active feedback instance model storage 142 of the feedback instance model repository 110.

The FICUR 116, in some embodiments, is implemented as a policy application executable by the PE processing unit 300 of the PE 104. In other embodiments, such as the illustrated embodiment, the FICUR 116 is implemented as an external entity that is in communication with the PE 104 to support the modification of feedback instance models. A feedback instance modification request, such as the feedback instance modification request 504, can be received from the PE 104, although in some embodiments, the FICUR 116 can subscribe to requests directly from an actor external to the PE 104.

The illustrated FIOC 126 is located downstream from the FICUR 116 in the feedback instance architecture 100. The FIOC 126 can respond to the feedback instance modification realization request 514 received from the FICUR 116 to realize—that is, to put into production—the feedback instance model identified via a model identifier in the feedback instance modification realization request 514. The FIOC 126 can function as a supporting entity to the FICUR 116. In some embodiments, the functionality of the FIOC 126 is combined with the functionality of the FICUR 116. In other embodiments, such as the illustrated embodiment, the FIOC 126 is implemented as an external entity that is in communication with the FICUR 116.

The illustrated FIOC 126 includes the FIOC processing unit 322, the FIOC memory unit 324, the AIS module 326, the FES module 328, and the VAS module 330. The AIS module 326, the FES module 328, and the VAS module 330 can be stored in the FIOC memory unit 324 and can be executed by the FIOC processing unit 322 to cause the FIOC 126 to perform realization operations described herein.

The AIS module 326 can receive the feedback instance modification realization request 514 from the FICUR 116. The AIS module 326 can retrieve the modified instance model from the active feedback instance model storage 142 stored in the feedback instance model repository 110 utilizing the model identifier supplied in the feedback instance modification realization request 514.

The FES module 328 can decompose the modified feedback instance model retrieved from the feedback instance model repository 110 and can direct the AIS module 326 in an operation-by-operation manner to perform a realization process using the modified feedback instance model to deploy a modified feedback instance 516. The AIS module 326 can interact with one or more actors (illustrated as MFI actor_1-MFI actor_N) 518A-518N defined in the modified feedback instance 516 to establish connectivity as part of the realization process. The MFI actors 518A-518N can include actors that were inactive or otherwise unavailable in the original feedback instance 500. Also as part of the realization process, the AIS module 326 can negotiate with a data collection actor to ensure additional feedback instance data attributes can be obtained. As an example, assuming that a virtual router can provide one hundred attributes for performance monitoring, however, only ninety of the attributes are frequently used and the remaining ten include a large data set but less value. The feedback instance can be constructed back on only collecting the ninety attributes. When the needs arise, the AIS module 326 can look into the data set the virtual router contains, the flexibility of the data collection API, and can then instruct an analytic module to start collection of the additional ten attributes for certain duration. The AIS module 326 also can connect with any newly added analytic algorithm(s) and/or program(s) for the modified feedback instance module.

The VAS module 330 can perform one or more verification operations before activating the modified feedback instance 516 in production. As an example, verification operations can ensure that all actors are in active state and there are no other conflicting feedback instance(s) running or other policy attribute restrictions (such as time of day, location, and/or the like). The VAS module 330 can perform one or more activation operations to activate the modified feedback instance 516 in production.

Figure 6:
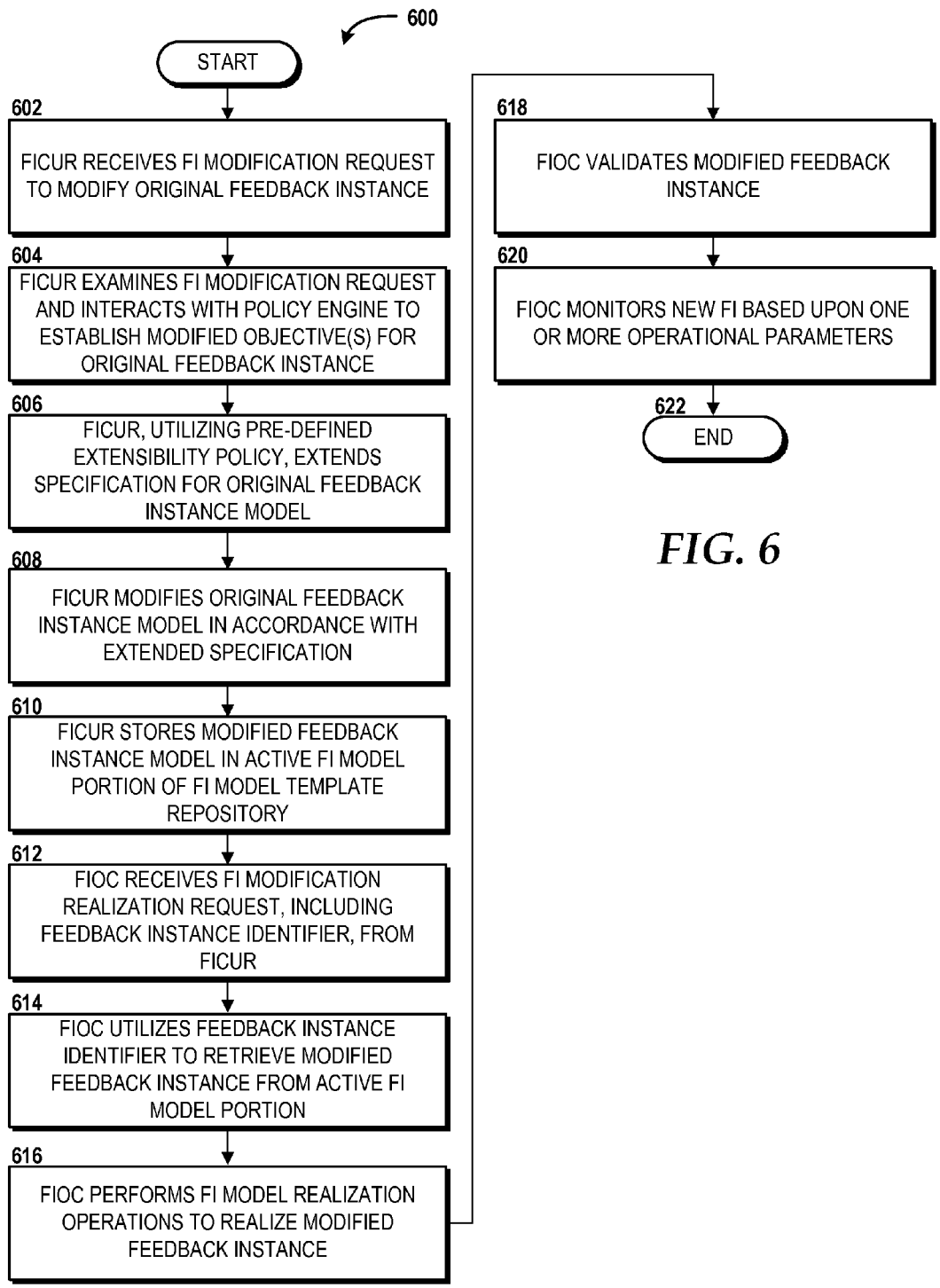
FIG. 6 is a flow diagram illustrating aspects of a method for modifying an existing feedback instance in the feedback instance architecture, according to an illustrative embodiment of the concepts and technologies disclosed herein.

Turning now to FIG. 6, aspects of a method 600 for modifying an existing feedback instance, such as the original feedback instance 500, in the feedback instance architecture 100" will be described, according to an illustrative embodiment. The method 600 will be described with reference to FIG. 6 and further reference to FIG. 5. The method 600 begins at operation 602, where the FICUR 116 receives the feedback instance modification request 504 from the PE 104. The feedback instance modification request 504 can be generated by the PE 104 to instruct the FICUR 116 to change, adjust, upgrade, or otherwise modify one or more existing, active feedback instances, such as the original feedback instance 500. For ease of explanation, the feedback instance modification request 504 will be described herein as instructing the FICUR 116 to modify the original feedback instance 500 to cure one or more deficiencies of the original feedback instance 500.

From operation 602, the method 600 proceeds to operation 604, where the FICUR 116 examines the feedback instance modification request 504 to determine which aspects of the original feedback instance 500 are to be modified. At operation 604, the FICUR 116 also interacts with the PE 104 to establish one or more modified objectives to be used to enhance the original feedback instance 500 to cure one or more deficiencies of the original feedback instance 500.

From operation 604, the method 600 proceeds to operation 606, where the FICUR 116 uses a pre-defined extensibility policy to extend the specification of the original feedback instance model utilized to create the original feedback instance 500 to allow for the creation of a modified feedback instance model to create the modified feedback instance 516. An extensibility policy allows an original feedback instance model, used to create an original feedback instance, to be extended in various ways to support creation of a modified feedback instance. A feedback instance model might be allowed to be modified only if the result will still be within a pre-defined set of extensibility policies or constraints. A network fault management feedback instance might not be allowed to be extended to become a security virus detection feedback instance. A compute-based feedback instance might not be allowed to be extended to a network monitoring feedback instance. When a modification request is received and analyzed, a new model objective might be determined that can involve adding or dropping some of the actors in the original feedback instance. The new model objective might involve maintaining the same set of actors but simply adding or removing/modifying some of the actions that are allowed to be taken, or adding/removing/modifying some attributes from data collection module, or adding/removing/modifying new limitation to the API definition between two actors. The allowed manner and extent of allowable modification is defined by the extensibility policies. For example, for a VM restart compute feedback instance, the extensibility policies might be to allow extending the model to another region but within California (or another state) only, to allow extending the model to include one or more hypervisors, to allow extending the feedback instance only if the average the controller CPU utilization is below 70%, to allow extending the feedback instance only if the actors added in belong to other compute infrastructure within the same data center.

From operation 606, the method 600 proceeds to operation 608, where the FICUR 116 modifies the original feedback instance model in accordance with the extended specification. From operation 608, the method 600 proceeds to operation 610, where the FICUR 116 stores the modified feedback instance model in the active feedback instance model storage 142 of the feedback instance model repository 110.

From operation 610, the method 600 proceeds to operation 612, where the FIOC 126 receives the feedback instance modification realization request 514, including a model identifier associated with the modified feedback instance model, from the FICUR 116. From operation 612, the method 600 proceeds to operation 614, where the FIOC 126 retrieves the modified feedback instance model from the feedback instance model repository 110 in accordance with the model identifier received in the feedback instance modification realization request 514.

From operation 614, the method 600 proceeds to operation 616, where the FIOC 126 performs feedback instance model realization operations to deploy the modified feedback instance 516 in production. From operation 616, the method 600 proceeds to operation 618, where the FIOC 126 validates the modified feedback instance 516. From operation 618, the method 600 proceeds to operation 620, where the FIOC 126 monitors the modified feedback instance 516 based upon one or more operational parameters.

From operation 620, the method 600 proceeds to operation 622. The method 600 ends at operation 622.

Figure 7:
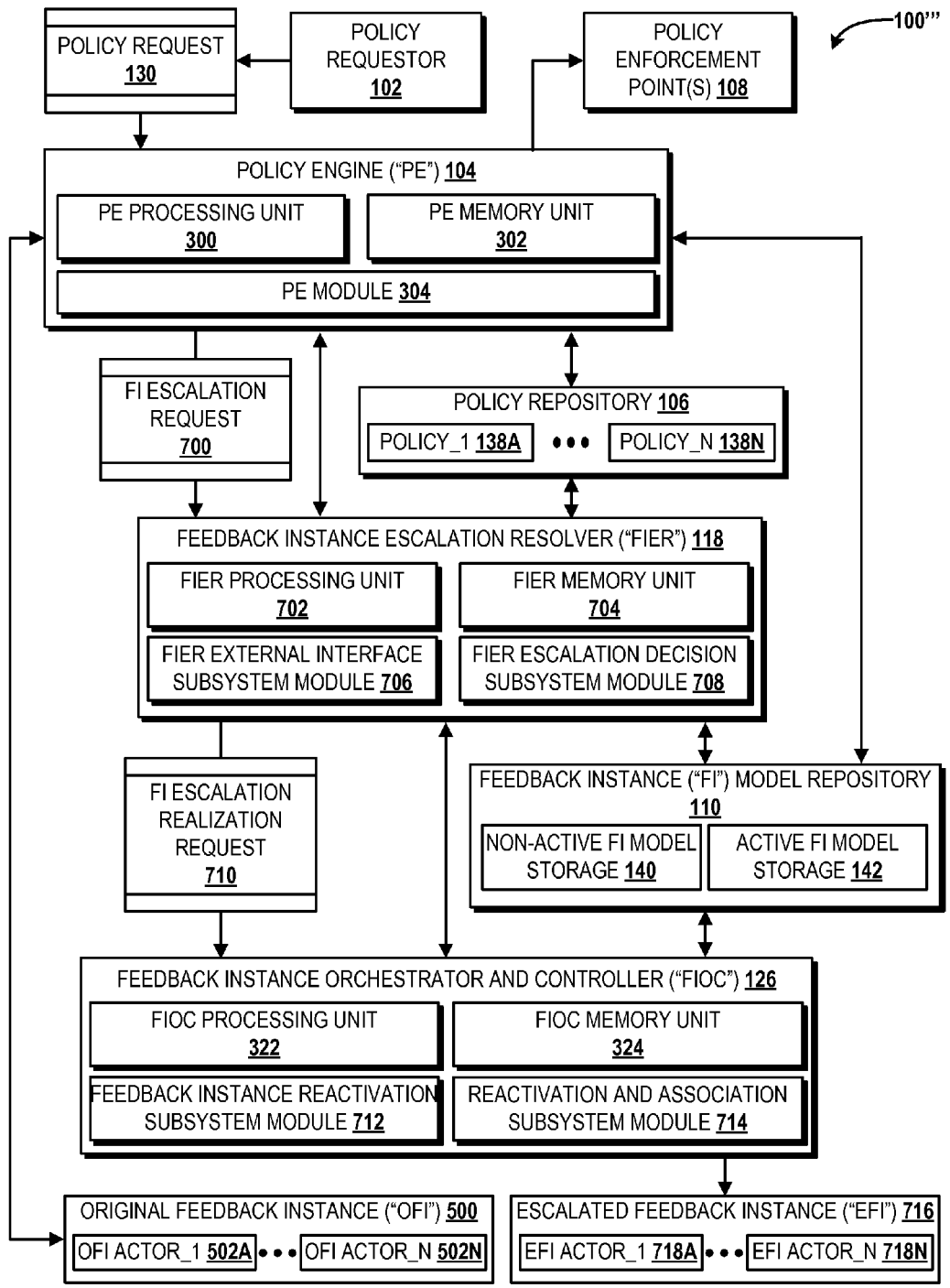
FIG. 7 is a block diagram illustrating further aspects of the feedback instance architecture, according to an illustrative embodiment.

Turning now to FIG. 7, a block diagram illustrating further aspects of a feedback instance architecture 100''' will be described, according to an illustrative embodiment. The illustrated feedback instance architecture 100''' includes the policy requestor 102, the PE 104, the policy repository 106, the FIER 118, the feedback instance model repository 110, and the FIOC 126. Each of these components and others will be described in detail below. While connections are shown between some of the components illustrated in FIG. 7, it should be understood that some, none, or all of the components illustrated in FIG. 7 can be configured to interact with one another to carry out various operations described herein. Thus, it should be understood that FIG. 7 and the following description are intended to provide a general understanding of a suitable environment in which various aspects of embodiments can be implemented, and should not be construed as being limiting in any way.

The PE 104 can receive the policy request 130 from the policy requestor 102 and can determine, through a policy decision process, whether or not a policy exists that can be utilized to satisfy the policy request 130. If so, the PE 104 can activate the policy and can instruct the policy enforcement point(s) 108 to enforce the policy. The illustrated PE 104 includes the PE processing unit 300, the PE memory unit 302, and the PE module 304 described above. The PE module 304 can be executed by the PE processing unit 300 to perform operations in response to the policy request 130. More particularly, the PE module 304 can execute operations of a policy decision process through which the PE module 304 determines whether to activate one or more existing policies, such as one or more of the policies 138, stored in the policy repository 106. If the PE module 304 determines that at least one of the policies 138 in the policy repository 106 should be activated in response to the policy request 130, the PE module 304 can retrieve the one or more policies 138 from the policy repository 106 and can instruct the policy enforcement point(s) 108 to enforce the one or more policies 138. If, however, the PE module 304 determines that none of the policies 138 in the policy repository 106 should be activated in response to the policy request 130, the PE module 304 can determine whether an existing, active feedback instance, such as the original feedback instance 500, can be utilized to satisfy the policy request 130. If an existing, active feedback instance can be utilized to satisfy the policy request 130, the PE 104 can associate that existing, active feedback instance with the policy request 130. For example, if the PE 104 determines that the original feedback instance 500 can be utilized to satisfy the policy request 130, the PE 104 can associate the original feedback instance 500 with the policy request 130. If, however, the original feedback instance 500 cannot be utilized to satisfy the policy request 130, the PE 104 can identify one or more deficiencies in the original feedback instance 500 that can be cured via an escalation process disclosed herein. For example, the original feedback instance 500 might fail to meet one or more objectives or might detect an anomaly that the original feedback instance 500 cannot handle. The escalation process described herein can enable escalation of the issue experienced by the original feedback instance 500 to another feedback instance, as will be described in further detail herein.

The illustrated original feedback instance 500 includes the original feedback instance actors 502A-502N, although the original feedback instance 500 might include a different number of actors. The original feedback instance 500 might be deficient in one or more aspects. The original feedback instance 500 might be deficient in a number of actors and/or type of actor. In some embodiments, the original feedback instance 500 includes a particular actor but can be deficient in that the particular actor is inactive. Alternatively, in other embodiments, the original feedback instance 500 does not include an actor and, in this manner, is deficient. The original feedback instance 500 might be deficient in a number of inputs and/or type of inputs. The original feedback instance 500 might be deficient in a type or number of operational parameters and/or values associated therewith. The original feedback instance 500 might be deficient in one or more analytic applications, and might benefit from or require the addition of one or more analytic applications and/or the removal of one or more analytic applications to cure a deficiency. The original feedback instance 500 might need changes to other attributes such as, but not limited, to capacity, traffic, and the like.

The PE 104 can generate a feedback instance escalation request 700 directed to the FIER 118 to notify the FIER 118 of one or more deficiencies in the original feedback instance 500. The FIER 118 can convey issues (e.g., deficiencies) unresolved in one feedback instance to another active or non-active feedback instance. The illustrated FIER 118 includes an FIER processing unit 702, an FIER memory unit 704, an FIER EIS module 706, and the FIER EDS module 708. The FIER EIS module 706 and the FIER EDS module 708 can be stored in the FIER memory unit 704 and can be executed by the FIER processing unit 702 to cause the FIER 118 to perform operations to escalate feedback instances in accordance with embodiments disclosed herein.

The FIER processing unit 702 can be or can include one or more CPUs configured with one or more processing cores. The FIER processing unit 702 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FIER processing unit 702 can be or can include one or more discrete GPUs. In some other embodiments, the FIER processing unit 702 can be or can include CPU and GPU components that are configured in accordance with a co-processing CPU/GPU computing model, wherein the sequential part of an application executes on the CPU and the computationally-intensive part is accelerated by the GPU. The FIER processing unit 702 can be or can include one or more FPGAs. The FIER processing unit 702 can be or can include one or more SoC components along with one or more other components, including, for example, the FIER memory unit 704. In some embodiments, the FIER processing unit 702 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FIER processing unit 702 can be or can include one or more hardware components architected in accordance with an ARM architecture, available for license from ARM HOLDINGS of Cambridge, United Kingdom. Alternatively, the FIER processing unit 702 can be or can include one or more hardware components architected in accordance with an x86 architecture, such an architecture available from INTEL CORPORATION of Mountain View, Calif., and others. Those skilled in the art will appreciate the implementation of the FIER processing unit 702 can utilize various computation architectures, and as such, the FIER processing unit 702 should not be construed as being limited to any particular computation architecture or combination of computation architectures, including those explicitly disclosed herein.

The FIER memory unit 704 can be or can include one or more hardware components that perform storage operations, including temporary and/or permanent storage operations. In some embodiments, the FIER memory unit 704 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FIER processing unit 702.

The FIER EIS module 706 can receive and examine feedback instance escalation requests, such as the illustrated feedback instance escalation request 700 received from the PE 104. The FIER EIS module 706 can receive and examine other feedback instance escalation requests from other participating actors. Escalation requests might often or usually come from the policy engine 104. However, in some cases, an escalation request can come from or result from any of the participating actors. For example, one cloud controller might raise concerns regarding consistently encountering resource contention issues but the impact is confined within the cloud controller's own domain (i.e., not within the current scope of the feedback instance). The FIER 118 might still take this request seriously and might decide to escalate to another more appropriate feedback instance in order to relieve some burden from the local cloud controller. The FIER EIS module 706 can provide a feedback instance escalation realization request 710 to the FIOC 126 so that the FIER 118 can perform model escalation operations described herein. The feedback instance escalation realization request 710 can include a suggested escalation model identifier associated with a suggested feedback instance escalation model. The suggested feedback instance escalation model can be determined by the FIER EDS module 708 as described below.

The FIER EDS module 708 can examine the feedback instance escalation request 700 along with the objective(s) of the original feedback instance 500 using policy rules to define one or more new model objectives. Policy can be used to define new model objectives. For example, the original model for a particular feedback instance might be to focus on VM performance within a single data center. However, due to some problem that has occurred in a nearby data center, many of the resources are now used to support that data center. The objective of the original feedback instance that has been defined to have a local (single data center) view might no longer be satisfactory. A new objective might be to monitor the process across multiple data centers. In this case, the issue might be better addressed by escalating to another feedback instance that already has a view into all four of the data centers in question.

Based upon the new model objective(s), the FIER EDS module 708 can search the non-active feedback instance model storage 140 and the active feedback instance model storage 142 of the feedback instance model repository 110 for possible feedback instance escalation model candidates. The FIER EDS module 708 also can calculate a distance score among all or a subset of the possible model candidates. Distance scores might be calculated to determine how alike or unlike two feedback instances are, both in terms of particular feedback instance definitional dimension aspects and also overall. Overall distances can be calculated, for example, by summing or averaging the distance values of each definitional dimension or aspect. Definitional/model aspects can include: the various types, extents, specifics, and frequency of data collected by a feedback instance; the type, degree, and other descriptive factors regarding analysis to be performed (and multiples of these if multiple types of analysis are included in the feedback instance); the number of participating actors and associated specific identities; the target(s) (which may be actors or particular aspects/components of actors) of the feedback instance in terms of what particular entity/behavior/functionality or entities/behaviors/functionalities the feedback instance is intended to affect; and any other possible feedback instance definition components that may exist or may be added. For each separable aspect, or for groups of aspects in any reasonable combination, distance values might be configured such that certain values or settings of aspect(s) are closer together or farther apart (i.e., having shorter/smaller or larger/farther "distances" therebetween). Actual values can be numerical or in any other form or format that might be useful. For example, when a feedback instance escalation request is received, in many cases, more than one feedback instance may be suitable as the escalation target. In order to determine to which feedback instance to escalate, a distance score might help in determining which feedback instance to select (e.g., the feedback instance that is closest—shortest overall "distance"—to what is needed).

The FIER EDS module 708 can select a best match based upon which of the possible model candidates has the highest distance score. The model with the highest distance score can be determined to be the suggested feedback instance escalation model. The FIER EDS module 708 can provide a suggested model escalation identifier associated with the suggested feedback instance escalation model to the FIER EIS module 706, which can generate the feedback instance escalation realization request 710 including the suggested model escalation identifier, and can provide the feedback instance escalation realization request 710 to the FIOC 126.

The FIER 118, in some embodiments, is implemented as a policy application executable by the PE processing unit 300 of the PE 104. In other embodiments, such as the illustrated embodiment, the FIER 118 is implemented as an external entity that is in communication with the PE 104 to support the escalation of feedback instance models. A feedback instance escalation request, such as the feedback instance escalation request 700, can be received from the PE 104, although in some embodiments, the FIER 118 can subscribe to requests directly from an actor external to the PE 104.

The illustrated FIOC 126 is located downstream from the FIER 118 in the feedback instance architecture 100. The FIOC 126 can respond to the feedback instance escalation realization request 710 received from the FIER 118 to realize—that is, to put into production—the feedback instance escalation model identified via a model identifier in the feedback instance escalation realization request 710. The FIOC 126 can function as a supporting entity to the FIER 118. In some embodiments, the functionality of the FIOC 126 is combined with the functionality of the FIER 118. In other embodiments, such as the illustrated embodiment, the FIOC 126 is implemented as an external entity that is in communication with the FIER 118.

The illustrated FIOC 126 includes the FIOC processing unit 322, the FIOC memory unit 324, a feedback instance reactivation subsystem ("FIRS") module 712, and a reactivation and association subsystem ("RAS") module 714. The FIRS module 712 and the RAS module 714 can be stored in the FIOC memory unit 324 and can be executed by the FIOC processing unit 322 to cause the FIOC 126 to perform escalation operations described herein.

The FIRS module 712 can receive the feedback instance escalation realization request 710 from the FIER 118. The FIRS module 712 can be executed when the model identifier received in the feedback instance escalation realization request 710 is related to a non-active feedback instance. When the non-active feedback instance model is located, the FIRS module 712 can validate the non-active feedback instance to ensure the non-active feedback instance model meets the entire specification for the non-active feedback instance as stored in the non-active feedback instance model storage 140 of the feedback instance model repository 110.

The RAS module 714 can reactivate the validated, non-active feedback instance and can associate the feedback escalation realization request 710 with the reactivated feedback instance, which, in the illustrated example, is an escalated feedback instance 716 that includes one or more escalated feedback instance actors 718A-718N. The RAS module 714 can enable one or more visualization policies so that the escalated feedback instance can be visually observed by operations pertaining to the escalation identifier. Visualization policies can allow an escalated feedback instance to be visually observed by operations pertaining to an escalation identifier in various ways, including any filters to be applied, preferred visualization mechanisms or factors, preferences or requirements applying, conditional aspects, and the like. For instance, once a feedback instance is escalated to a different feedback instance, the operations personnel should be able to visualize the newly-escalated feedback instance. Operations personnel might benefit from visual indications that escalation has occurred, the scope or purpose of the escalation, the cause of the escalation, the progress or current status regarding the escalation objective, any associated constraints or limitations, any conditions that might result in a request for manual intervention, and the like. Which of these apply, how they apply, and/or mechanisms to be used can be included in visualization policies.

The FIOC 126 can be implemented as an orchestration application within a service and/or resource orchestrator or can be implemented as an external entity in communication with such an orchestrator. When the FIOC 126 is implemented as an external entity to the orchestrator, the FIOC 126 can leverage the existing interface infrastructure of the orchestrator.

Based on the foregoing, an escalation can include a determination that a second feedback instance is to be assigned an additional responsibility and an assignment of the additional responsibility to the second feedback instance based upon information provided by the FIER 118. The FIER 118 can adjust the definition of the second feedback instance to have an expanded or multiple scopes.

Figure 8:
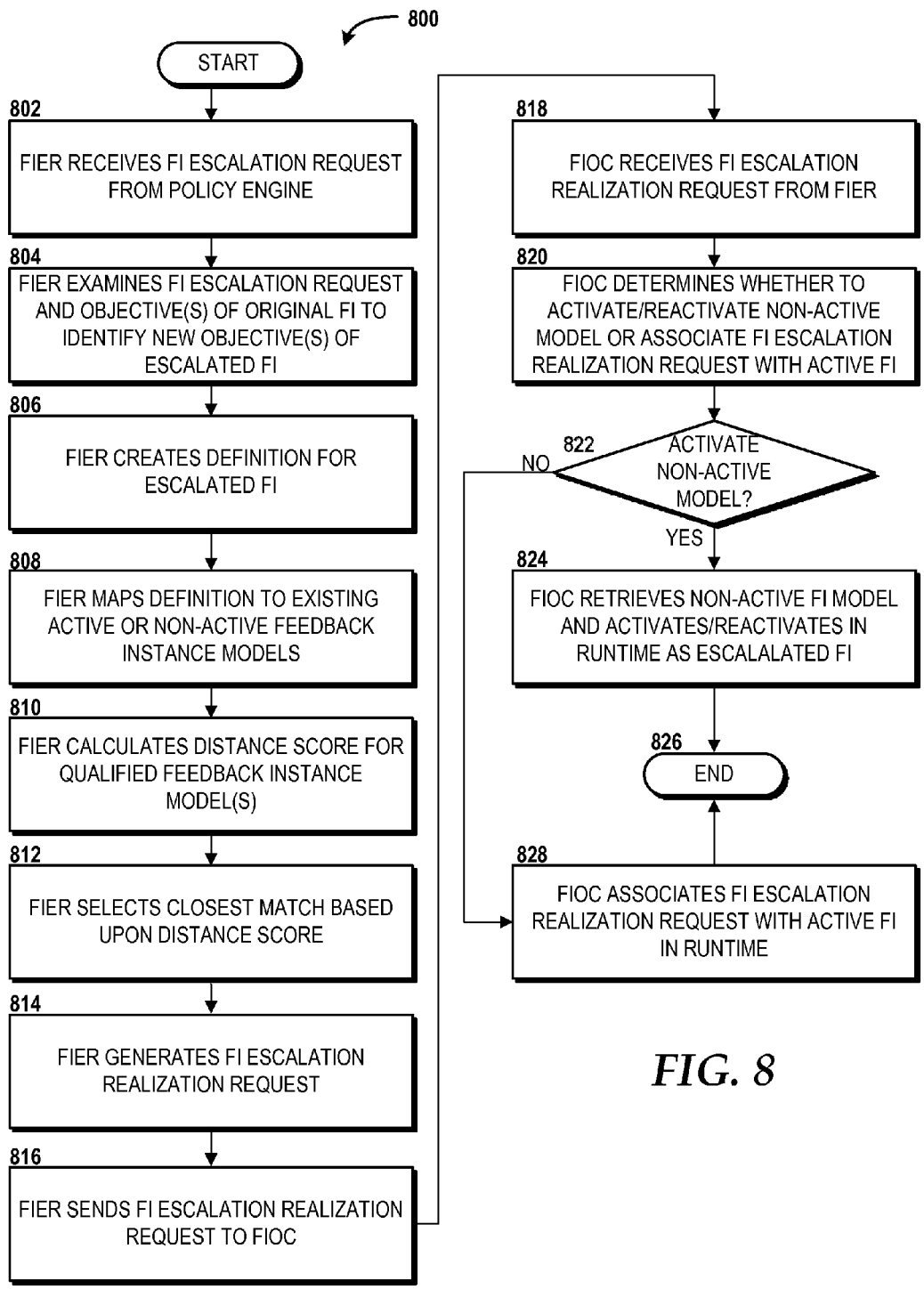
FIG. 8 is a flow diagram illustrating aspects of a method for escalating a feedback instance in the feedback instance architecture, according to an illustrative embodiment of the concepts and technologies disclosed herein.

Turning now to FIG. 8, aspects of a method 800 for escalating a feedback instance, such as the original feedback instance 500, in the feedback instance architecture 100''' will be described, according to an illustrative embodiment. The method 800 will be described with reference to FIG. 8 and further reference to FIG. 7. The method 800 begins at operation 802, where the FIER 118 receives the feedback instance escalation request 700 from the policy engine 104. From operation 802, the method 800 proceeds to operation 804, where the FIER 118 examines the feedback instance escalation request 700 and one or more objectives of the original feedback instance 500 to identify one or more escalated objectives for the escalated feedback instance 716.

From operation 804, the method 800 proceeds to operation 806, where the FIER 118 creates a definition for the escalated feedback instance 716. The definition can include the escalated objective(s) identified in operation 804 along with one or more escalated targets and one or more escalated inputs to satisfy the escalated objective(s). The escalated target(s) can include one or more actors to be influenced by the escalated feedback instance 716. The escalated input(s) can include the specific input(s) to be utilized by the escalated feedback instance 716.

From operation 806, the method 800 proceeds to operation 808, where the FIER 118 maps the definition for the escalated feedback instance 716 to one or more active feedback instance models identified in the active feedback instance model storage 142 of the feedback instance model repository 110 and/or to one or more non-active feedback instance models identified in the non-active feedback instance model storage 140 of the feedback instance model repository 110. In some embodiments, the FIER 118 can utilize a table of all or a relevant subset of available active and non-active feedback instances to map the definition for the escalated feedback instance 716. The table can be updated to accommodate new or different feedback instance models.

From operation 808, the method 800 proceeds to operation 810, where the FIER 118 calculates a distance score for each qualified feedback instance model, or in other words, to each feedback instance model to which the definition for the escalated feedback instance 716 has been mapped in operation 808. From operation 810, the method 800 proceeds to operation 812, where the FIER 118 selects the closest match based upon the distance scores calculated at operation 810. Although not shown in the illustrated example, a feedback instance model that is the closest match can be selected as a candidate for the escalated feedback instance 716 if the distance between the closest match and the definition for the escalated feedback instance 716 does not exceed one or more thresholds.

Thresholds might be used for many purposes, for example, in the determination of whether the "distance" between the closest match and the definition for the escalated feedback instance does not exceed one of more settable values along various dimensions. Multiple thresholds can be set, each for an acceptable maximum distance along a particular dimension. Dimensions might be defined for each aspect of the feedback instance definition, such that these dimensions or scales denote how closely two feedback instances are alike. The greater the "distances" between values or settings in dimensions, the more the feedback instances are different. Whereas the shorter or smaller the distances between them, the more the feedback distances are alike. If all distances are zero, reflecting no difference in the definitional aspects of the feedback instances, then two feedback instances are identical. Also, when looking for a feedback instance to which to escalate, one might find out that although there are a set of feedback instances to which to escalate, none of the feedback instances may match to the objectives 100%. One approach to help resolve this is to set a threshold rule. For example, if less than 70% of objectives can be handled by an identified feedback instance for escalation, then this percentage might be deemed unacceptable (i.e., not good enough), such that a brand new feedback instance will instead have to be created to which to escalate. If the distance does exceed one or more thresholds, the FIER 118 can instruct the FIOC 126 to create a new feedback instance model to resolve the issue(s) that prompted the escalation process.

From operation 812, the method 800 proceeds to operation 814, where the FIER 118 generates the feedback instance escalation realization request 710. From operation 814, the method 800 proceeds to operation 816, where the FIER 118 sends the feedback instance escalation realization request 710 to the FIOC 126. From operation 816, the method 800 proceeds to operation 818, where the FIOC 126 receives the feedback instance escalation realization request 710 from the FIER 118.

From operation 818, the method 800 proceeds to operation 820, where the FIOC 126 determines whether to activate or reactivate a non-active model or to associate the feedback instance escalation realization request 710 with an active feedback instance. From operation 820, the method 800 proceeds to operation 822, where if the FIOC 126 has determined to activate or re-activate a non-active feedback instance model, the method 800 proceeds to operation 824, where the FIOC 126 retrieves a non-active feedback instance model and activates the non-active feedback instance model in runtime as the escalated feedback instance 716. From operation 824, the method 800 proceeds to operation 826, where the method 800 ends. If, however, at operation 822, the FIOC 126 has determined not to activate or re-activate a non-active feedback instance model, the method 800 proceeds to operation 828, where the FIOC 126 associates the feedback instance escalation realization request 710 with an active feedback instance in runtime as the escalated feedback instance 716. From operation 824, the method 800 proceeds to operation 826, where the method 800 ends.

Figure 9:
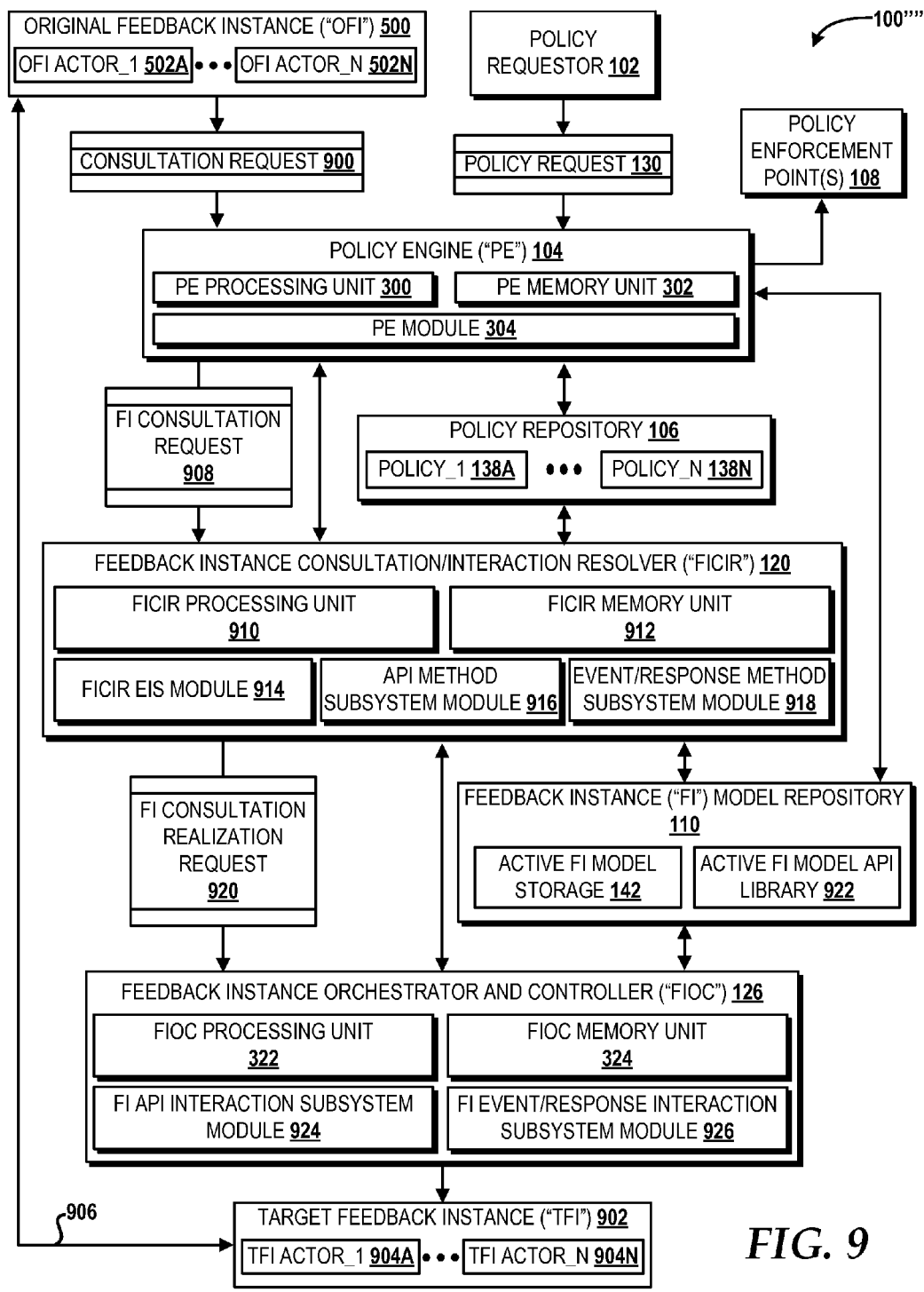
FIG. 9 is a block diagram illustrating further aspects of the feedback instance architecture, according to an illustrative embodiment.

Turning now to FIG. 9, a block diagram illustrating further aspects of the feedback instance architecture 100'''' will be described, according to an illustrative embodiment. The illustrated feedback instance architecture 100'''' includes the policy requestor 102, the PE 104, the policy repository 106, the FICIR 120, a feedback instance model repository 110, and the FIOC 126. Each of these components and others will be described in detail below. While connections are shown between some of the components illustrated in FIG. 9, it should be understood that some, none, or all of the components illustrated in FIG. 9 can be configured to interact with one another to carry out various operations described herein. Thus, it should be understood that FIG. 9 and the following description are intended to provide a general understanding of a suitable environment in which various aspects of embodiments can be implemented, and should not be construed as being limiting in any way.

The PE 104 can receive the policy request 130 from the policy requestor 102 and can determine, through a policy decision process, whether or not a policy exists that can be utilized to satisfy the policy request 130. If so, the PE 104 can activate the policy and can instruct the policy enforcement point(s) 108 to enforce the policy. The illustrated PE 104 includes the PE processing unit 300, the PE memory unit 302, and the PE module 304.

The PE module 304 can be executed by the PE processing unit 300 to perform operations in response to the policy request 130. More particularly, the PE module 304 can execute operations of a policy decision process through which the PE module 304 determines whether to activate one or more existing policies, such as one or more of the policies 138, stored in the policy repository 106. If the PE module 304 determines that at least one of the policies 138 in the policy repository 106 should be activated in response to the policy request 130, the PE module 304 can retrieve one or more of the policies 138 from the policy repository 106 and can instruct the policy enforcement point(s) 108 to enforce one or more of the policies 138. If, however, the PE module 304 determines that none of the policies 138 in the policy repository 106 should be activated in response to the policy request 130, the PE module 304 can determine whether an existing, active feedback instance, such as the original feedback instance 500, can be utilized to satisfy the policy request 130. If an existing, active feedback instance can be utilized to satisfy the policy request 130, the PE 104 can associate that existing, active feedback instance with the policy request 130. For example, if the PE 104 determines that the original feedback instance 500 can be utilized to satisfy the policy request 130, the PE 104 can associate the original feedback instance 500 with the policy request 130. If, however, the original feedback instance 500 cannot be utilized to satisfy the policy request 130, the PE 104 can identify one or more deficiencies in the original feedback instance 500 that can be cured via a feedback instance consultation process disclosed herein.

The illustrated original feedback instance 500 includes the OFI actors 502A-502N, although the original feedback instance 500 might include a different number of actors. The original feedback instance 500 might be deficient in one or more aspects. The original feedback instance 500 might be deficient in a number of actors and/or type of actor. In some embodiments, the original feedback instance 500 includes a particular actor but can be deficient in that the particular actor is inactive. Alternatively, in other embodiments, the original feedback instance 500 does not include an actor and, in this manner, is deficient. The original feedback instance 500 might be deficient in a number of inputs and/or type of inputs. The original feedback instance 500 might be deficient in a type or number of operational parameters and/or values associated therewith. The original feedback instance 500 might be deficient in one or more analytic applications, and might benefit from or require the addition of one or more analytic applications and/or the removal of one or more analytic applications to cure a deficiency. The original feedback instance 500 might need changes to other attributes such as, but not limited, to capacity, traffic, and the like.

In response to identifying one or more deficiencies, the original feedback instance 500 can generate a consultation request 900 directed to the policy engine 104. The consultation request 900 can be utilized by the original feedback instance 500 to request help from one or more different feedback instances, such as a target feedback instance 902, which can include one or more actors, such as target feedback instance actor(s) 904A-904N, that can utilize a consultation communications link 906 to communicate with the original feedback instance actor(s) 502A-502N to help the original feedback instance 500 cure one or more deficiencies.

In response to receiving the consultation request 900 from the original feedback instance 500, the PE 104 can generate a feedback instance consultation request 908. The PE 104, in some embodiments, can generate the feedback instance consultation request 908 after verifying the validity of the consultation request 900. For example, the PE 104 can reference one or more policies regarding permissions for the original feedback instance 500 to consult with one or more different feedback instances, such as the target feedback instance 902. Alternatively, the PE 104, in some embodiments, can function as a pass-through for communications between the original feedback instance 500 and the FICIR 120. In these embodiments, the feedback instance consultation request 908 might be the same as or similar to the consultation request 900. In either the case, the FICIR 120 can receive the feedback instance consultation request 908 and can perform one or more operations of a consultation process described in further detail herein below, at least in part, to help the original feedback instance 500 cure one or more deficiencies.

The illustrated FICIR 120 includes an FICIR processing unit 910, an FICIR memory unit 912, an FICIR EIS module 914, an API method subsystem ("APIMS") module 916, and an event/response method subsystem ("ERMS") module 918. The FICIR EIS module 914, the APIMS module 916, and the ERMS module 918 can be stored in the FICIR memory unit 912 and can be executed by the FICIR processing unit 910 to cause the FICIR 120 to perform operations to facilitate consultation among feedback instances in accordance with embodiments disclosed herein.

The FICIR processing unit 910 can be or can include one or more CPUs configured with one or more processing cores. The FICIR processing unit 910 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FICIR processing unit 910 can be or can include one or more discrete GPUs. In some other embodiments, the FICIR processing unit 910 can be or can include CPU and GPU components that are configured in accordance with a co-processing CPU/GPU computing model, wherein the sequential part of an application executes on the CPU and the computationally-intensive part is accelerated by the GPU. The FICIR processing unit 910 can be or can include one or more FPGAs. The FICIR processing unit 910 can be or can include one or more SoC components along with one or more other components, including, for example, the FICIR memory unit 912. In some embodiments, the FICIR processing unit 910 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FICIR processing unit 910 can be or can include one or more hardware components architected in accordance with an ARM architecture, available for license from ARM HOLDINGS of Cambridge, United Kingdom. Alternatively, the FICIR processing unit 910 can be or can include one or more hardware components architected in accordance with an x86 architecture, such an architecture available from INTEL CORPORATION of Mountain View, Calif., and others. Those skilled in the art will appreciate the implementation of the FICIR processing unit 910 can utilize various computation architectures, and as such, the FICIR processing unit 910 should not be construed as being limited to any particular computation architecture or combination of computation architectures, including those explicitly disclosed herein.

The FICIR memory unit 912 can be or can include one or more hardware components that perform storage operations, including temporary and/or permanent storage operations. In some embodiments, the FICIR memory unit 912 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FICIR processing unit 910.

The FICIR EIS module 914 can receive and examine consultation requests, such as the illustrated feedback instance consultation request 908 received from the PE 104. The FICIR EIS module 914 can deliver to the FIOC 126 a feedback instance consultation realization request 920. The feedback instance consultation realization request 920 can include a requesting model identifier associated with a requesting feedback instance model such as the model associated with the original feedback instance 500. The feedback instance consultation realization request 920 also can include a target model identifier associated with a target feedback instance model, such as the model associated with the target feedback instance 902.

The APIMS module 916 can examine the feedback instance consultation request 908 and can search an active feedback instance model API library 922 stored in the feedback instance model repository 110 for an available API exposed by (i.e., offered by) a peer feedback instance, such as the target feedback instance 902 in the illustrated example, to allow consultation communications via the consultation communications link 906. The active feedback instance model API library 922 can include one or more APIs for each active feedback instance model in the active feedback instance model storage 142 upon which one or more currently active feedback instances are based (i.e., feedback instance(s) operating in runtime).

The ERMS module 918 can map the feedback instance consultation request 908 to an event/response already supported by a peer feedback instance, such as the target feedback instance 902. The result of one or more operations performed by the APIMS module 916 and the ERMS module 918 upon execution by the FICIR processing unit 910 can be delivered to the FIOC 126 via the FICIR EIS module 914 in the feedback instance consultation realization request 920 to establish the consultation communications link 906 between the original feedback instance 500 and the target feedback instance 902.

The FICIR 120, in some embodiments, is implemented as a policy application executable by the PE processing unit 300 of the PE 104. In other embodiments, such as the illustrated embodiment, the FICIR 120 is implemented as an external entity that is in communication with the PE 104 to support consultation among active feedback instances. A feedback instance consultation request, such as the illustrated feedback instance consultation request 908, can be received from the PE 104, although in some embodiments, the FICIR 120 can subscribe to requests directly from an actor external to the PE 104.

The illustrated FIOC 126 is located downstream from the FICIR 120 in the feedback instance architecture 100. The FIOC 126 can respond to the feedback instance consultation realization request 920 received from the FICIR EIS module 914 to realize—that is, to put into production—the consultation communications link 906 between the instances identified in the feedback instance consultation realization request 920, such as the original feedback instance 500 and the target feedback instance 902 in the illustrated example. The FIOC 126 can function as a supporting entity to the FICIR 120. In some embodiments, the functionality of the FIOC 126 is combined with the functionality of the FICIR 120. In other embodiments, such as the illustrated embodiment, the FIOC 126 is implemented as an external entity that is in communication with the FICIR 120.

In response to the feedback instance consultation realization request 920, the FIOC 126 can create and/or extend one or more intercommunication paths among two or more feedback instances. In the illustrated example the FIOC 126 creates the consultation communications link 906 between the original feedback instance 500 and the target feedback instance 902. In some embodiments, the FIOC 126 can extend the consultation communications link 906 to facilitate communications with one or more other feedback instances.

The illustrated FIOC 126 includes the FIOC processing unit 322, the FIOC memory unit 324, a feedback instance API interaction subsystem ("FIAPIIS") module 924, and a feedback instance event/response interaction subsystem ("FIERIS") module 926. The FIAPIIS module 924 and the FIERIS module 926 can be stored in the FIOC memory unit 324 and can be executed by the FIOC processing unit 322 to cause the FIOC 126 to perform consultation realization operations described herein.

The FIAPIIS module 924 can receive the feedback instance consultation realization request 920 from the FICIR 120. The FIAPIIS module 924 can be executed by the FIOC processing unit 322 to invoke an API call to one or more APIs published in the active feedback instance model API library 922 to establish communication with one or more target feedback instances, such as the illustrated target feedback instance 902. The FIERIS module 926 can be executed by the FIOC processing unit 322 to enable the requesting feedback instance, such as the original feedback instance 500, to execute operations of an event/response method to communicate with the target feedback instance, such as the target feedback instance 902, for consultation purposes to satisfy, at least in part, the policy request 130.

Figure 10:
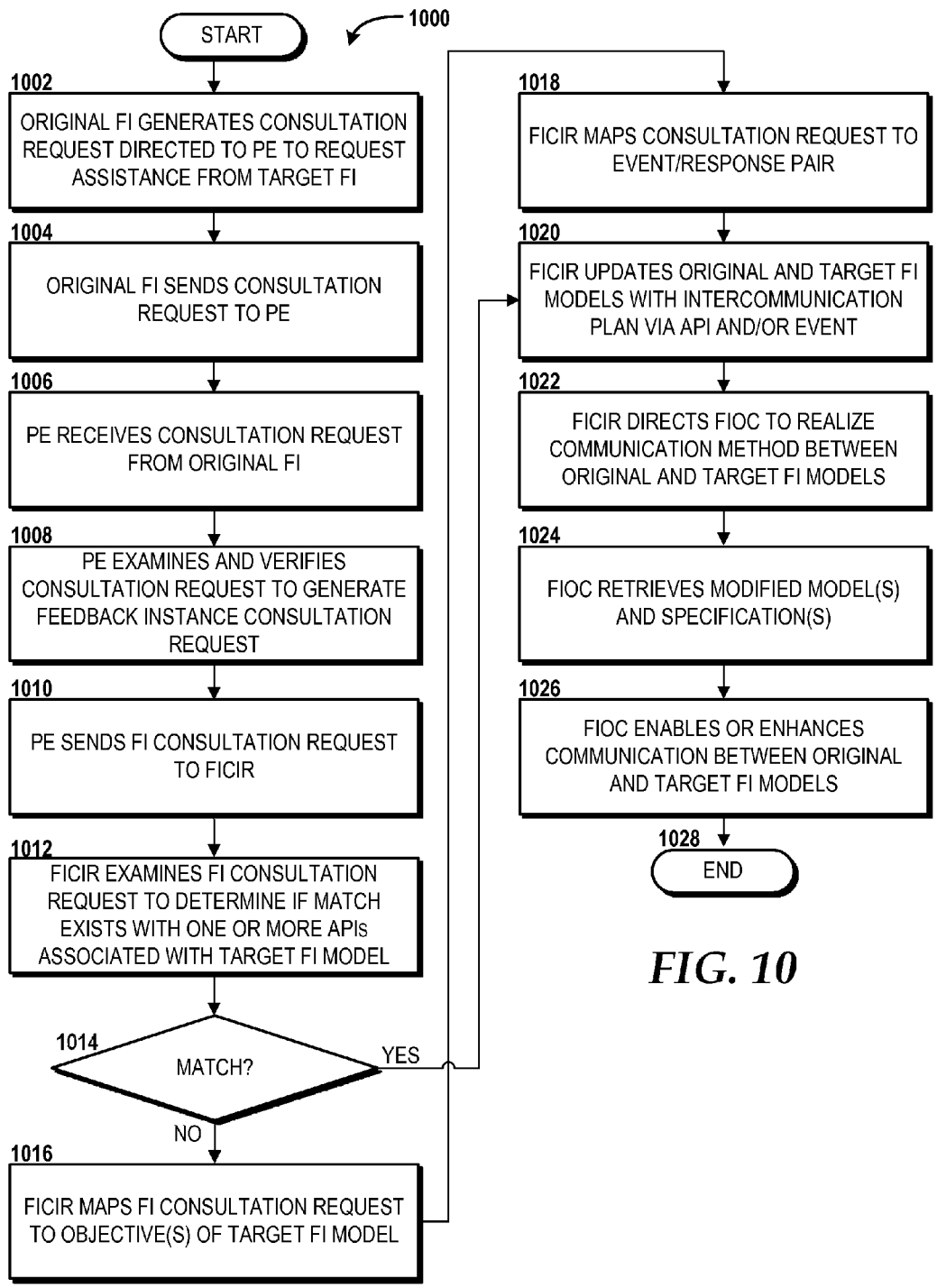
FIG. 10 is a flow diagram illustrating aspects of a method for consulting among feedback instances in the feedback instance architecture, according to an illustrative embodiment of the concepts and technologies disclosed herein.

Turning now to FIG. 10, aspects of a method 1000 for consulting among feedback instances in the feedback instance architecture 100″″ will be described, according to an illustrative embodiment. The method 1000 will be described with reference to FIG. 10 and further reference to FIG. 9. The method 1000 begins at operation 1002, where the original feedback instance 500 generates the consultation request 900 directed to the PE 104 to request establishment of a feedback instance intercommunication link, such as the consultation communications link 906, over which to receive assistance from one or more target feedback instances, such as the target feedback instance 902 in the example illustrated in FIG. 9, to help the original feedback instance 500 cure one or more deficiencies in a feedback instance model upon which the original feedback instance 500 is based. From operation 1002, the method 1000 proceeds to operation 1004, where the original feedback instance 500 sends the consultation request 900 to the PE 104.

From operation 1004, the method 1000 proceeds to operation 1006, where the PE 104 receives the consultation request 900 from the original feedback instance 500. From operation 1006, the method proceeds to operation 1008, where the PE 104 examines and verifies the consultation request 900 to generate the feedback instance consultation request 908. From operation 1008, the method 1000 proceeds to operation 1010, where the PE 104 sends the feedback instance consultation request 908 to the FICIR 120. The PE 104, in some embodiments, can generate the feedback instance consultation request 908 after verifying the validity of the consultation request 900. For example, the PE 104 can reference one or more policies regarding permissions for the original feedback instance 500 to consult with one or more different feedback instances, such as the target feedback instance 902. Alternatively, the PE 104, in some embodiments, can function as a pass-through for communications between the original feedback instance 500 and the FICIR 120. In these embodiments, the feedback instance consultation request 908 might be the same as or similar to the consultation request 900.

From operation 1010, the method 1000 proceeds to operation 1012, where the FICIR 120 examines the feedback instance consultation request 908 to determine if a match exists with one or more APIs associated with the target feedback instance model upon which the target feedback instance 902 is based. If, at operation 1014, the FICIR 120 determines that a match does not exist, the method 1000 proceeds to operation 1016. At operation 1016, the FICIR 120 maps the feedback instance consultation request 908 to one or more objectives of a target feedback instance model available from the active feedback instance model storage 142 of the feedback instance model repository 110 that can be utilized to cure one or more deficiencies of the original feedback instance 500.

From operation 1016, the method 1000 proceeds to operation 1018, where the FICIR 120 maps the feedback instance consultation request 908 to an event/response pair that is supported by the target feedback instance model to which the feedback instance consultation request 908 was mapped at operation 1016. The event/response pair can include an event to which the target feedback instance model subscribes. The event/response pair can include an event response to which the original feedback instance model should subscribe.

From operation 1018, the method 1000 proceeds to operation 1020, where the FICIR 120 updates the original and target feedback instance models with an intercommunication plan via an API and/or an event. Also, if, at operation 1014, the FICIR 120 determines that a match does exist, the method 1000 proceeds directly to operation 1020.

From operation 1020, the method 1000 proceeds to operation 1022, where the FICIR 120 directs the FIOC 126 to realize a communication method between the original and target feedback instance models via the feedback instance consultation realization request 920. From operation 1022, the method 1000 proceeds to operation 1024, where the FIOC 126 retrieves the modified (i.e., updated) original and target feedback instance models from the active feedback instance model storage 142 of the feedback instance model repository 110. From operation 1024, the method 1000 proceeds to operation 1026, where the FIOC 126 enables communication (e.g., establishes the consultation communications link 906) or enhances communication (e.g., extends connectivity of the consultation communications link 906) between the original and target feedback instance models, upon which the original feedback instance 500 and the target feedback instance 902 are respectively based.

From operation 1026, the method 1000 proceeds to operation 1028. The method 1000 ends at operation 1028.

Figure 11:
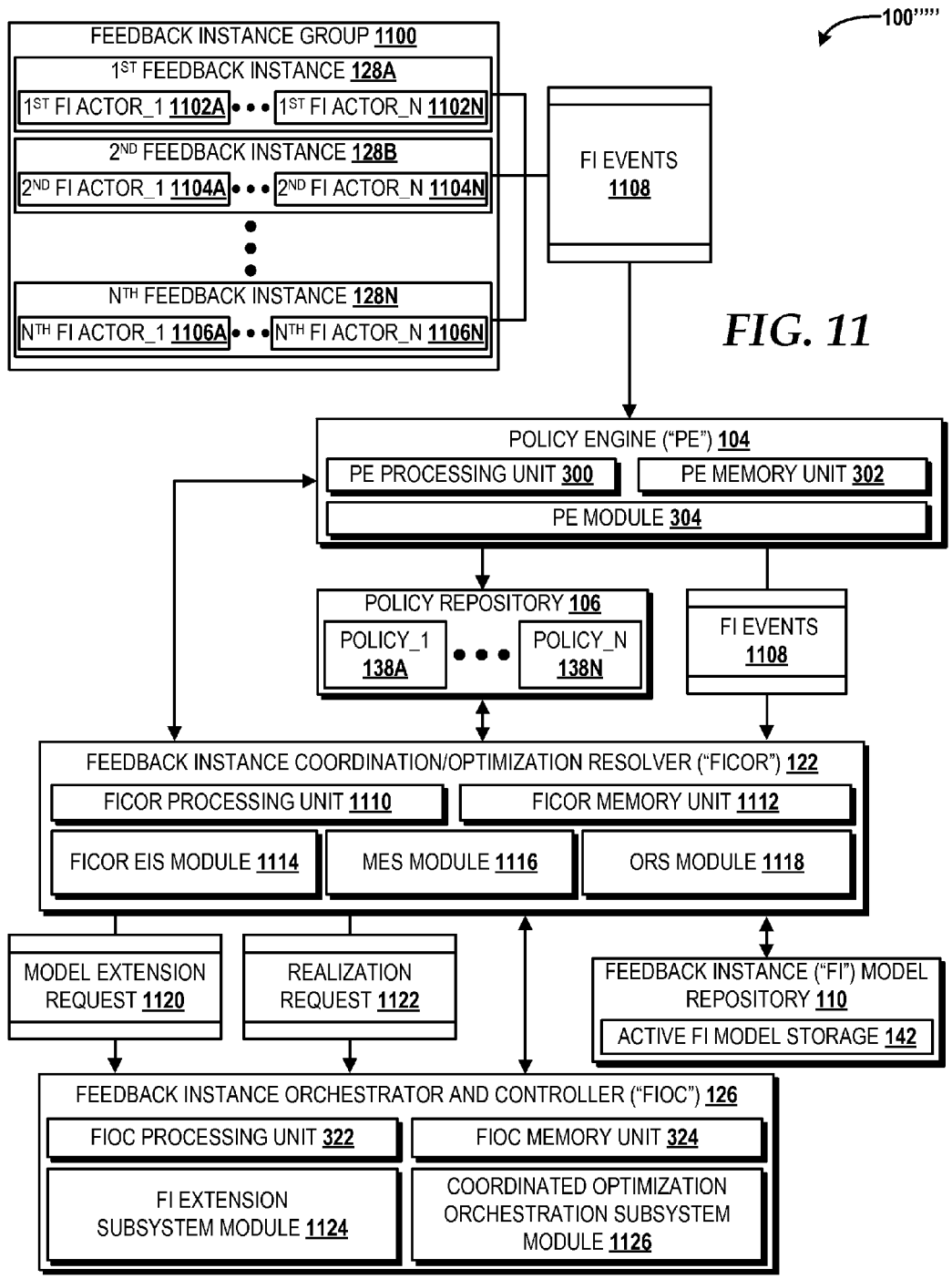
FIG. 11 is a block diagram illustrating further aspects of the feedback instance architecture, according to an illustrative embodiment.

Turning now to FIG. 11, a block diagram illustrating further aspects of the feedback instance architecture 100'''' will be described, according to an illustrative embodiment. The illustrated feedback instance architecture 100'''' includes the PE 104, the policy repository 106, the FICOR 122, the feedback instance model repository 110, and the FIOC 126. Each of these components and others will be described in detail below. While connections are shown between some of the components illustrated in FIG. 11, it should be understood that some, none, or all of the components illustrated in FIG. 11 can be configured to interact with one another to carry out various operations described herein. Thus, it should be understood that FIG. 11 and the following description are intended to provide a general understanding of a suitable environment in which various aspects of embodiments can be implemented, and should not be construed as being limiting in any way.

In the illustrated embodiment, a feedback instance group 1100 includes a plurality of feedback instances 128A, 128B, 128N, each of which includes one or more actors 1102A-1102N, 1104A-1104N, 1106A-1106N, respectively. The feedback instance group 1100 can generate one or more feedback instance events 1108. Each of the feedback instance events 1108 can be generated by one of the plurality of feedback instances 128A, 128B, 128N in the feedback instance group 1100 in response to detection of one or more anomalies. In some cases, a single set of anomalies might not be enough for the PE 104 or other decision making system to execute a complete optimization plan. The feedback instance events 1108 from the feedback instance group 1100 might need, or at least might benefit in some way from, being coordinated to derive an optimization plan. In order to support dynamic coordination, the FICOR 122 and the FIOC 126 will be utilized.

The PE 104 can receive the feedback instance events 1108 (or data such as the event data 132 associated therewith, as illustrated in FIG. 1). In the illustrated embodiment, the PE 104 can pass the feedback instance events 1108 to the FICOR 122. In other embodiments, the FICOR 122 can subscribe to the feedback instance group 1100 to receive all or a portion of the feedback events 1108. In other embodiments, the FICOR 122 can create the feedback instance group 1100 and can subscribe to two or more events generated by or otherwise associated with the feedback instance group 1100. The FICOR 122 can receive the feedback instance events 1108 and can leverage one or more policies, such as one or more of the policies 138, retrieved from the policy repository 106 to develop a coordinated optimization plan to optimize interactions among the feedback instances 128A-128N in the feedback instance group.

The FICOR 122 includes a FICOR processing unit 1110, a FICOR memory unit 1112, a FICOR EIS module 1114, a method extender subsystem ("MES") module 1116, and an optimization resolver subsystem ("ORS") module 1118. The FICOR EIS module 1114, the MES module 1116, and the ORS module 1118 can be stored in the FICOR memory unit 1112 and can be executed by the FICOR processing unit 1110 to cause the FICOR 122 to perform operations to coordinate and optimize events among feedback instances in a feedback instance group in accordance with embodiments disclosed herein.

The FICOR processing unit 1110 can be or can include one or more CPUs configured with one or more processing cores. The FICOR processing unit 1110 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FICOR processing unit 1110 can be or can include one or more discrete GPUs. In some other embodiments, the FICOR processing unit 1110 can be or can include CPU and GPU components that are configured in accordance with a co-processing CPU/GPU computing model, wherein the sequential part of an application executes on the CPU and the computationally-intensive part is accelerated by the GPU. The FICOR processing unit 1110 can be or can include one or more FPGAs. The FICOR processing unit 1110 can be or can include one or more SoC components along with one or more other components, including, for example, the FICOR memory unit 1112. In some embodiments, the FICOR processing unit 1110 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FICOR processing unit 1110 can be or can include one or more hardware components architected in accordance with an ARM architecture, available for license from ARM HOLD- INGS of Cambridge, United Kingdom. Alternatively, the FICOR processing unit 1110 can be or can include one or more hardware components architected in accordance with an x86 architecture, such an architecture available from INTEL CORPORATION of Mountain View, Calif., and others. Those skilled in the art will appreciate the implementation of FICOR processing unit 1110 can utilize various computation architectures, and as such, FICOR processing unit 1110 should not be construed as being limited to any particular computation architecture or combination of computation architectures, including those explicitly disclosed herein.

The FICOR memory unit 1112 can be or can include one or more hardware components that perform storage operations, including temporary and/or permanent storage operations. In some embodiments, the FICOR memory unit 1112 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FICIR processing unit 910.

The FICOR EIS module 1114 can receive and examine the feedback instance events 1108 received from the feedback instance group 1100 that should be coordinated. The FICOR EIS module 1114 also can provide one or more model extension requests 1120 to the FIOC 126 to instruct the FIOC 126 to extend a selected set of feedback instances and deliver a finalized optimization plan to the FIOC 126 for execution.

The MES module 1116 can determine whether feedback instance model(s) in the selected set of feedback instances should be extended. If the MES module 1116 determines that feedback instance model(s) in the selected set of feedback instances should be extended, the MES module 1116 can instruct the FIOC 126 to extend the feedback instance model(s) via one or more model extension requests 1120. The ORS module 1118 can map the feedback instance events 1108 collected from the feedback instance group 1100 to a coordinated optimization plan and can instruct the FIOC 126 to realize the coordinated optimization plan via a realization request 1122.

The FICOR 122, in some embodiments, is implemented as a policy application executable by the PE processing unit 300 of the PE 104. In other embodiments, such as the illustrated embodiment, the FICOR 122 is implemented as an external entity that is in communication with the PE 104.

The illustrated FIOC 126 is located downstream from the FICOR 122 in the feedback instance architecture 100. The FIOC 126 can respond to the model extension request 1120 received from the FICOR EIS module 1114 by extending one or more feedback instance models. The FIOC 126 can respond to the realization request 1122 received from the FICOR EIS module 1114 to realize—that is, to put into production—the optimization plan.

The FIOC 126 can function as a supporting entity to the FICOR 122. In some embodiments, the functionality of the FIOC 126 is combined with the functionality of the FICOR 122. In other embodiments, such as the illustrated embodiment, the FIOC 126 is implemented as an external entity that is in communication with the FICOR 122.

The illustrated FIOC 126 includes the FIOC processing unit 322, the FIOC memory unit 324, a feedback instance extension subsystem ("FIES") module 1124, and a coordinated optimization orchestration subsystem ("COOS") module 1126. The FIES module 1124 and the COOS module 1126 can be stored in the FIOC memory unit 324 and can be executed by the FIOC processing unit 322 to cause the FIOC 126 to perform optimization orchestration operations described herein.

The FIES module 1124 can receive the model extension request 1120 from the FICOR 122. The FIES module 1124 can be executed by the FIOC processing unit 322 to extend the event scope of the selected set of feedback instances. The COOS module 1126 is used to enable the execution of the optimization plan by interacting with all or at least a portion of the participating feedback instances. The FIOC 126 can be implemented as an orchestration application within a service/resource orchestrator or can be implemented as an external entity in communication with the orchestrator. When the FIOC 126 is implemented as an external entity to the orchestrator, the FIOC 126 should attempt to leverage the existing interface infrastructure of the orchestrator.

Figure 12:
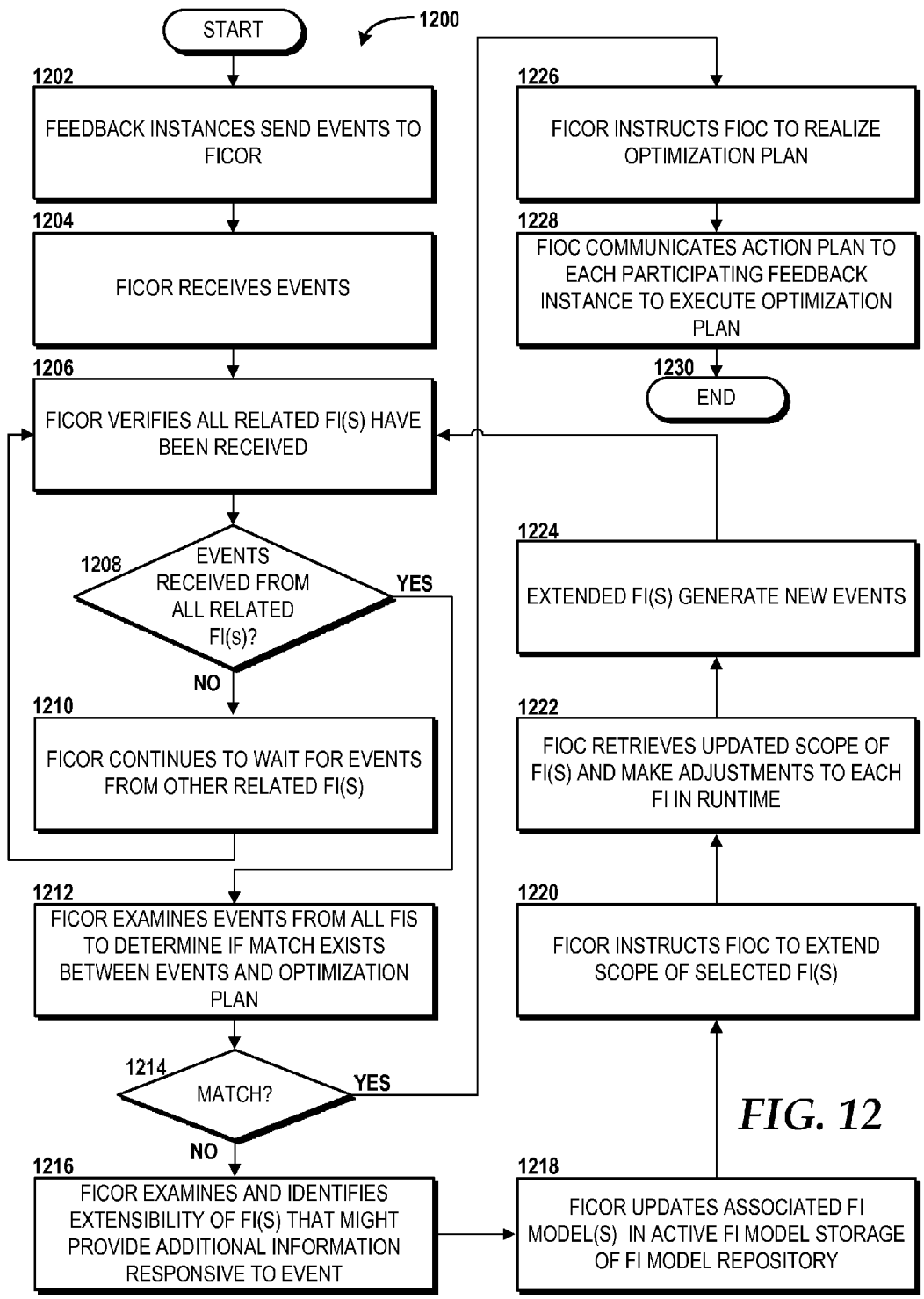
FIG. 12 is a flow diagram illustrating aspects of a method for coordinating multiple feedback instances to determine optimal actions in the feedback instance architecture, according to an illustrative embodiment of the concepts and technologies disclosed herein.

Turning now to FIG. 12, a method 1200 for coordinating multiple feedback instances to determine optimal actions to be taken in the feedback instance architecture 100"" will be described, according to an illustrative embodiment. The method 1200 begins and proceeds to operation 1202, where feedback instances, such as one or more of the feedback instances 128A-128N send the feedback instance events 1108 to the FICOR 122. From operation 1202, the method 1200 proceeds to operation 1204, where the FICOR 122 receives the feedback instance events 1108.

From operation 1204, the method 1200 proceeds to operation 1206, where the FICOR 122 verifies that all related feedback instances have been received for an optimization plan to optimize actions to be taken by a group of feedback instances, such as the feedback instance group 1100. From operation 1206, the method 1200 proceeds to operation 1208, where the FICOR 122 determines whether events have been received from all related feedback instances in the feedback instance group 1100. If not, the method 1200 proceeds to operation 1210, where the FICOR 122 continues to wait for events from one or more other related feedback instances and the method 1200 returns to operation 1206. After all events from the feedback instance group 1100 have been received, the method 1200 proceeds to operation 1212, where the FICOR 122 examines the feedback instance events 1108 from all feedback instances in the feedback instance group 1100 to determine whether the feedback instance events 1108 can be matched to a single actionable optimization plan.

If, at operation 1214, the FICOR 122 determines that a match does not exist, the method 1200 proceeds from operation 1214 to operation 1216, where the FICOR 122 examines and identifies extensibility of one or more feedback instances that might provide additional information responsive to one or more of the feedback instance events 1108. From operation 1216, the method 1200 proceeds to operation 1218, where the FICOR 122 updates feedback instance model(s) associated with the feedback instances from which the feedback instance events 1108 were received in the active feedback instance model storage 142 of the feedback instance model repository 110. From operation 1218, the method 1200 proceeds to operation 1220, where the FICOR 122 instructs the FIOC 126 to extend the scope, via the model extension request 1120, of one or more feedback instances identified at operation 1216. From operation 1220, the method 1200 proceeds to operation 1222, where the FIOC 126 retrieves the updated scope for each feedback instance identified at operation 1216 and makes one or more adjustments to each feedback instance in runtime. From operation 1222, the method 1200 proceeds to operation 1224, where the extended feedback instances can generate one or more new events. The method 1200 can return to operation 1206, where the where the FICOR 122 continues to verify that all related feedback instances have been received for the optimization plan. As such, the method 1200, or at least the aforementioned operations of the method 1200, can be dynamic and continuous, and thus may repeat as new events are obtained by the FICOR 122, and as new optimization plans are sent to the FIOC 126 to be executed/enforced by the set of coordinated feedback instances as appropriate.

If, however, at operation 1214, the FICOR 122 determines that a match exists, the method 1200 proceeds to operation 1226, where the FICOR 122 instructs the FIOC 126, via the realization request 1122, to realize the matched optimization plan. From operation 1226, the method 1200 proceeds to operation 1228, where the FIOC 126 communicates an action plan to each participating feedback instance to execute the optimization plan. From operation 1228, the method 1200 proceeds to operation 1230, where the method 1200 ends.

Figure 13:
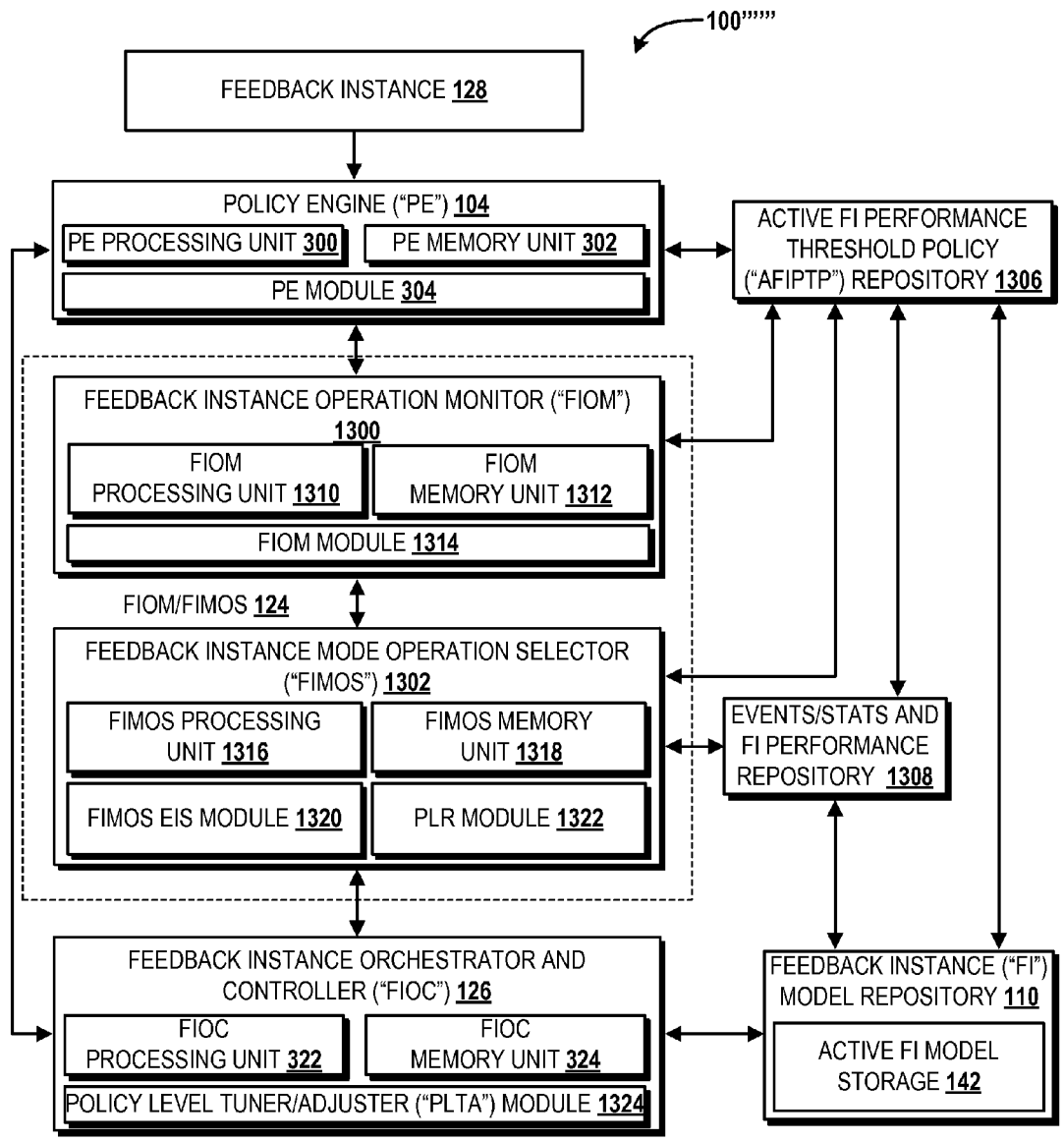
FIG. 13 is a block diagram illustrating further aspects of the feedback instance architecture, according to an illustrative embodiment.

Turning now to FIG. 13, a block diagram illustrating further aspects of the feedback instance architecture 100''''' will be described, according to an illustrative embodiment. The illustrated feedback instance architecture 100''''' includes the PE 104; the FIOM/FIMOS 124, which includes a FIOM 1300 and a FIMOS 1302; the feedback instance model repository 110; the FIOC 126; an active feedback instance performance threshold policy ("AFIPTP") repository 1306; and an events/stats and feedback instance performance repository 1308. Each of these components and others will be described in detail below. While connections are shown between some of the components illustrated in FIG. 13, it should be understood that some, none, or all of the components illustrated in FIG. 13 can be configured to interact with one another to carry out various operations described herein. Thus, it should be understood that FIG. 13 and the following description are intended to provide a general understanding of a suitable environment in which various aspects of embodiments can be implemented, and should not be construed as being limiting in any way.

The PE 104 can communicate with the FIOM 1300 and the FIMOS 1302. The PE 104 includes the PE processing unit 300, the PE memory unit 302, and the PE module 304 described above. The FIOM 1300 and the FIMOS 1302 can coordinate adjustment and execution of policy participation level mode ("PPL mode") based upon current feedback instance conditions. Based on traffic conditions, computing or network resource conditions, energy conditions and priority considerations, explicit involvement of policy can be automatically or manually tuned/adjusted to a suitable mode. A "mode," as used herein, can represent a degree or level of guidance, constraints, required interactions, and/or the like provided by a policy. Alternately, or more generally, modes may reflect different (alternative, in any respect) policy guidance, constraints, required interactions, and/or the like.

The FIOM 1300 includes an FIOM processing unit 1310, an FIOM memory unit 1312, and an FIOM module 1314. The FIOM module 1314 can be stored in the FIOM memory unit 1312 and can be executed by the FIOM processing unit 1310 to cause the FIOM 1300 to perform operations to monitor feedback instances in accordance with embodiments disclosed herein.

The FIOM processing unit 1310 can be or can include one or more CPUs configured with one or more processing cores. The FIOM processing unit 1310 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FIOM processing unit 1310 can be or can include one or more discrete GPUs. In some other embodiments, the FIOM processing unit 1310 can be or can include CPU and GPU components that are configured in accordance with a co-processing CPU/GPU computing model, wherein the sequential part of an application executes on the CPU and the computationally-intensive part is accelerated by the GPU. The FIOM processing unit 1310 can be or can include one or more FPGAs. The FIOM processing unit 1310 can be or can include one or more SoC components along with one or more other components, including, for example, the FIOM memory unit 1312. In some embodiments, the FIOM processing unit 1310 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FIOM processing unit 1310 can be or can include one or more hardware components architected in accordance with an ARM architecture, available for license from ARM HOLDINGS of Cambridge, United Kingdom. Alternatively, the FIOM processing unit 1310 can be or can include one or more hardware components architected in accordance with an x86 architecture, such an architecture available from INTEL CORPORATION of Mountain View, Calif., and others. Those skilled in the art will appreciate the implementation of the FIOM processing unit 1310 can utilize various computation architectures, and as such, the FIOM processing unit 1310 should not be construed as being limited to any particular computation architecture or combination of computation architectures, including those explicitly disclosed herein.

The FIOM memory unit 1312 can be or can include one or more hardware components that perform storage operations, including temporary and/or permanent storage operations. In some embodiments, the FIOM memory unit 1312 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FIOM processing unit 1310.

The FIOM 1300, in some embodiments, is implemented as a policy application executable by the PE processing unit 300 of the PE 104. In other embodiments, such as the illustrated embodiment, the FIOM 1300 is implemented as an external entity that is in communication with the PE 104.

The FIOM module 1314 can be executed by the FIOM processing unit 1310 to monitor performance of one or more active feedback instances, such as the feedback instance 128, to detect a possible trigger point for a PPL mode adjustment for one or more actors operating as part of the feedback instance 128

The FIMOS 1302 includes a FIMOS processing unit 1316, a FIMOS memory unit 1318, a FIMOS EIS module 1320, and a participation level resolver ("PLR") module 1322. The FIMOS EIS module 1320 and the PLR module 1322 can be stored in the FIMOS memory unit 1318 and can be executed by the FIMOS processing unit 1316 to cause the FIMOS 1302 to perform operations to adjust a participation level of one or more actors in one or more feedback instances, such as the feedback instance 128, in accordance with embodiments disclosed herein.

The FIMOS processing unit 1316 can be or can include one or more CPUs configured with one or more processing cores. The FIMOS processing unit 1316 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FIMOS processing unit 1316 can be or can include one or more discrete GPUs. In some other embodiments, the FIMOS processing unit 1316 can be or can include CPU and GPU components that are configured in accordance with a co-processing CPU/GPU computing model, wherein the sequential part of an application executes on the CPU and the computationally-intensive part is accelerated by the GPU. The FIMOS processing unit 1316 can be or can include one or more FPGAs. The FIMOS processing unit 1316 can be or can include one or more SoC components along with one or more other components, including, for example, the FIMOS memory unit 1318. In some embodiments, the FIMOS processing unit 1316 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FIMOS processing unit 1316 can be or can include one or more hardware components architected in accordance with an ARM architecture, available for license from ARM HOLDINGS of Cambridge, United Kingdom. Alternatively, the FIMOS processing unit 1316 can be or can include one or more hardware components architected in accordance with an x86 architecture, such an architecture available from INTEL CORPORATION of Mountain View, Calif., and others. Those skilled in the art will appreciate the implementation of the FIMOS processing unit 1316 can utilize various computation architectures, and as such, the FIMOS processing unit 1316 should not be construed as being limited to any particular computation architecture or combination of computation architectures, including those explicitly disclosed herein.

The FIMOS memory unit 1318 can be or can include one or more hardware components that perform storage operations, including temporary and/or permanent storage operations. In some embodiments, the FIMOS memory unit 1318 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FIMOS processing unit 1316.

The FIMOS 1302, in some embodiments, is implemented as a policy application executable by the PE processing unit 300 of the PE 104. In other embodiments, such as the illustrated embodiment, the FIMOS 1302 is implemented as an external entity that is in communication with the PE 104.

The FIMOS EIS module 1320 and the PLR module 1322 can be executed by the FIMOS processing unit 1316. The FIMOS EIS module 1320 can receive, from the FIOM 1300, one or more events associated with the feedback instance 128. The PLR module 1322 can determine whether the policy participation level of the feedback instance 128 should be adjusted. The PLR module 1322 can then map out the level of participation for each actors in feedback instance 128. The PLR module 1322 also can save changes to the participation level in association with the feedback instance model upon which the feedback instance 128 is based in the active feedback instance model storage 142. The PLR module 1322 also can send a policy participation level adjustment request to the FIMOS EIS module 1320 for delivery to the FIOC 126.

The illustrated FIOC 126 is located downstream from the FIOM/FIMOS 124 in the feedback instance architecture 100. The illustrated FIOC 126 includes the FIOC processing unit 322, the FIOC memory unit 324, and a policy level tuner/adjuster ("PLTA") module 1324. The PLTA module 1324 can be stored in the FIOC memory unit 324 and can be executed by the FIOC processing unit 322 to cause the FIOC 126 to perform operations described herein.

The FIOC processing unit 322 can be or can include one or more CPUs configured with one or more processing cores. The FIOC processing unit 322 can be or can include one or more GPUs configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the FIOC processing unit 322 can be or can include one or more discrete GPUs. In some other embodiments, the FIOC processing unit 322 can be or can include CPU and GPU components that are configured in accordance with a co-processing CPU/GPU computing model, wherein the sequential part of an application executes on the CPU and the computationally-intensive part is accelerated by the GPU. The FIOC processing unit 322 can be or can include one or more FPGAs. The FIOC processing unit 322 can be or can include one or more SoC components along with one or more other components, including, for example, the FIOC memory unit 324. In some embodiments, the FIOC processing unit 322 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The FIOC processing unit 322 can be or can include one or more hardware components architected in accordance with an ARM architecture, available for license from ARM HOLDINGS of Cambridge, United Kingdom. Alternatively, the FIOC processing unit 322 can be or can include one or more hardware components architected in accordance with an x86 architecture, such an architecture available from INTEL CORPORATION of Mountain View, Calif., and others. Those skilled in the art will appreciate the implementation of the FIOC processing unit 322 can utilize various computation architectures, and as such, the FIOC processing unit 322 should not be construed as being limited to any particular computation architecture or combination of computation architectures, including those explicitly disclosed herein.

The FIOC memory unit 324 can be or can include one or more hardware components that perform storage operations, including temporary and/or permanent storage operations. In some embodiments, the FIOC memory unit 324 can include volatile and/or non-volatile memory implemented in any method or technology for storage of information such as computer-readable instructions, data structures, program modules, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the FIOC processing unit 322.

The FIOC 126 can respond to policy participation level adjustment requests received from the FIMOS EIS module 1320 by executing the PLTA module 1324 to tune/adjust the policy participation level of the feedback instance 128. The FIOC 126 can respond to the policy participation level of the feedback instance 128 by retrieving the associated feedback model from the active feedback instance model storage 142 and can interact with actors in the feedback instance 128 to adjust the policy participation level for each actor.

The FIOC 126 can function as a supporting entity to the FIMOS 1302. In some embodiments, the functionality of the FIOC 126 is combined with the functionality of the FIMOS 1302. In other embodiments, such as the illustrated embodiment, the FIOC 126 is implemented as an external entity that is in communication with the FIMOS 1302.

Figure 14:
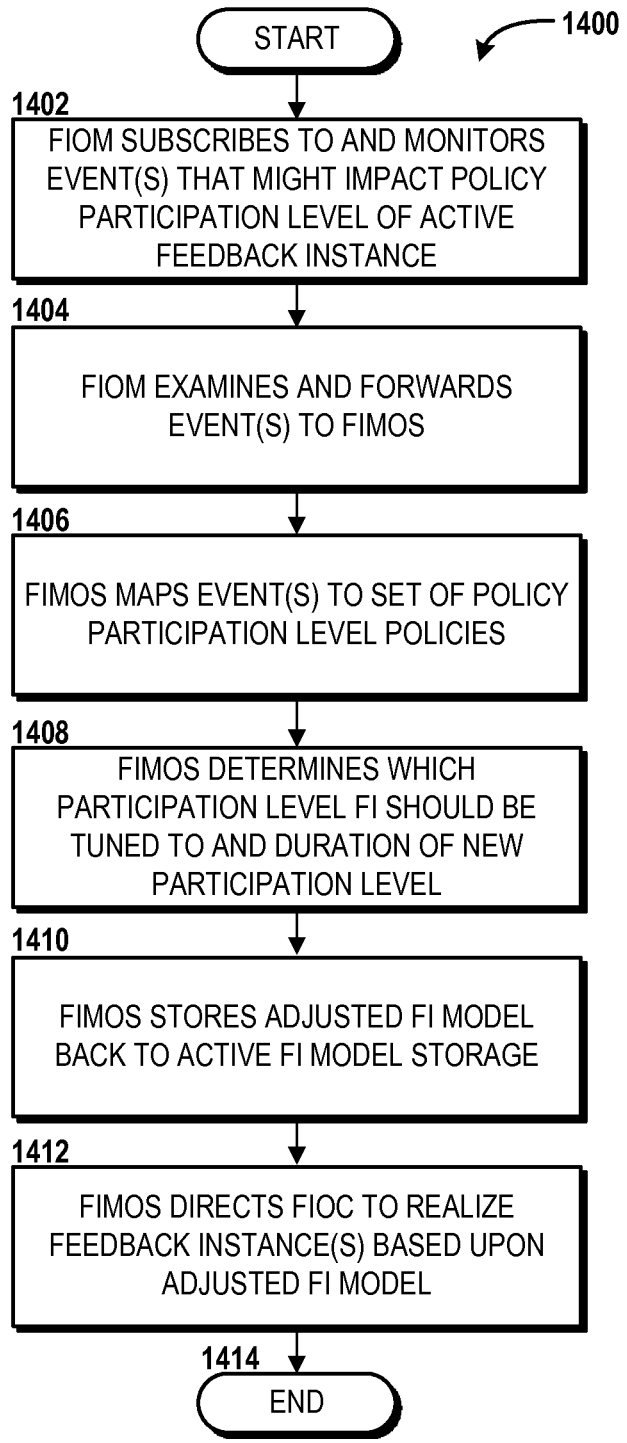
FIG. 14 is a flow diagram illustrating aspects of a method for selecting feedback instance modes, according to an illustrative embodiment.

Turning now to FIG. 14, a method 1400 for selecting feedback instance modes will be described, according to an illustrative embodiment. The method 1400 begins and proceeds to operation 1402, where the FIOM 1300 subscribes to and monitors one or more events that might impact a policy participation level of an active feedback instance, such as the feedback instance 128, or one or more actors thereof. From operation 1402, the method 1400 proceeds to operation 1404, where the FIOM 1300 examines and forwards the event(s) to the FIMOS 1302.

From operation 1404, the method 1400 proceeds to operation 1406, where the FIMOS 1302 maps the event(s) to a set of policy participation level policies. From operation 1406, the method 1400 proceeds to operation 1408, where the FIMOS 1302 determines which participation level the feedback instance 128 should be tuned to and duration of the new participation level. From operation 1408, the method 1400 proceeds to operation 1410, where the FIMOS 1302 stores a feedback instance model adjusted in accordance with the participation level determined at operation 1408 in the active feedback instance model storage 142. From operation 1410, the method 1400 proceeds to operation 1412, where the FIMOS 1302 directs the FIOC 126 to realize one or more feedback instances and/or adjust the feedback instance 128 based upon the adjusted feedback instance model.

From operation 1412, the method 1400 proceeds to operation 1414. The method 1400 ends at operation 1414.

One non-limiting example of the method 1400 will now be described. In this example, a first feedback instance can involve a network controller, an orchestrator, an analytic module, and the PE 104. The first feedback instance can identify compute and network traffic anomalies for a large international bank, in conjunction with strict policy rules that have to be followed in order to enforce performance security requirements and guidelines during normal business hours. The rules may not be relaxed in after-hour time due to being international in nature. For purposes of this example, assume that a financial crisis in one of the nations has caused unusual traffic volumes to withdraw funds. An anomaly is accordingly detected. Since the signature indicates that there is no security threat, and the anomaly is really due to the financial crisis, security policy does not need to play such a large role in this scenario, and therefore the policy participation with respect to the strictness of security enforcement is reduced in this particular case to allow more real-time allocation of VM resources to best accommodate the actual situation.

Figure 15:
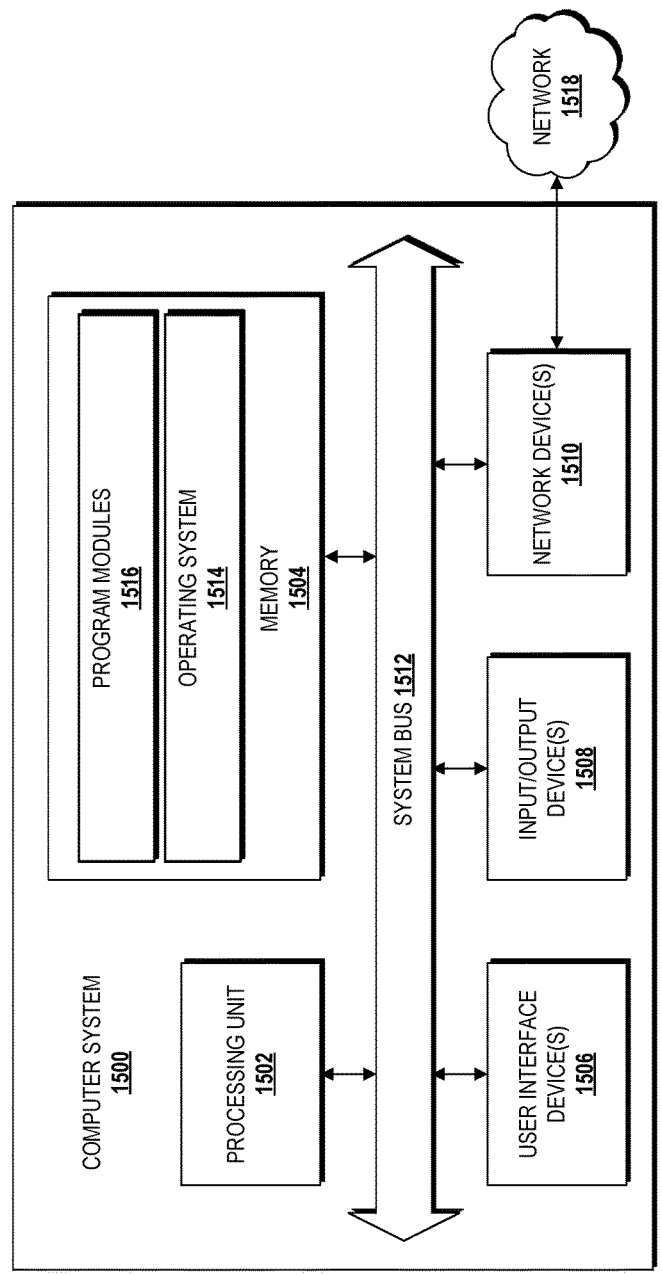
FIG. 15 is a block diagram illustrating an example computer system capable of implementing aspects of the embodiments presented herein.

FIG. 15 is a block diagram illustrating a computer system 1500 configured to provide the functionality in accordance with various embodiments of the concepts and technologies disclosed herein. In some implementations, the policy requestor(s) 102, the PE 104, the policy repository 106, the policy enforcement point(s) 108, the feedback instance model repository 110, the other repositories 112, the FIRC 114, the FICUR 116, the FIER 118, the FICIR 120, the FICOR 122, the FIOM/FIMOS 124, the FIOC 126, other components described herein, or combinations thereof can be or can include one or more computers that are configured the same as or like the architecture of the computer system 1500. It should be understood, however, that modification to the architecture may be made to facilitate certain interactions among elements described herein.

The computer system 1500 includes a processing unit 1502, a memory 1504, one or more user interface devices 1506, one or more input/output ("I/O") devices 1508, and one or more network devices 1510, each of which is operatively connected to a system bus 1512. The system bus 1512 enables bi-directional communication between the processing unit 1502, the memory 1504, the user interface devices 1506, the I/O devices 1508, and the network devices 1510.

The processing unit 1502 may be a standard central processor that performs arithmetic and logical operations, a more specific purpose programmable logic controller ("PLC"), a programmable gate array, or other type of processor described herein or known to those skilled in the art and suitable for controlling the operation of the computer system 1500. Processing units are generally known, and therefore are not described in further detail herein. The PE processing unit 300, the FIRC processing unit 310, the FIOC processing unit 322, the FICUR processing unit 506, the FIER processing unit 702, the FICIR processing unit 910, the FICOR processing unit 1110, the FIOM processing unit 1310, the FIMOS processing unit 1316, or a combination thereof can include one or more of the processing units 1502.

The memory 1504 communicates with the processing unit 1502 via the system bus 1512. In some embodiments, the memory 1504 is operatively connected to a memory controller (not shown) that enables communication with the processing unit 1502 via the system bus 1512. The PE memory unit 302, the FIRC memory unit 312, the FIOC memory unit 324, the FICUR memory unit 508, the FIER memory unit 704, the FICIR memory unit 912, the FICOR memory unit 1112, the FIOM memory unit 1312, the FIMOS memory unit 1318, or a combination thereof can include one or more instances of the memory 1504.

The illustrated memory 1504 includes an operating system 1514 and one or more program modules 1516. The operating system 1514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1516 may include various software and/or program modules to perform the various operations described herein. The program modules 1516 and/or other programs can be embodied in computer-readable media containing instructions that, when executed by the processing unit 1502, perform various operations such as those described herein. According to embodiments, the program modules 1516 may be embodied in hardware, software, firmware, or any combination thereof. The program modules 1516 can include the PE module 304, the EIS module 314, the PAS module 316, the MES module 318, the AIS module 326, the FES module 328, the VAS module 330, the FIER EIS module 706, the FIER EDS module 708, the FIRS module 712, the RAS module 714, the FICIR EIS module 914, the APIMS module 916, the ERMS module 918, the FIAPIIS module 924, the FIERIS module 926, the FICOR EIS module 1114, the MES module 1116, the ORS module 1118, the FIES module 1124, the COOS module 1126, or a combination thereof.

By way of example, and not limitation, computer-readable media may include any available computer storage media or communication media that can be accessed by the computer system 1500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency ("RF"), infrared ("IR") and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1500. In the claims, the phrase "computer storage medium" and variations thereof does not include waves or signals per se and/or communication media.

The user interface devices 1506 may include one or more devices with which a user accesses the computer system 1500. The user interface devices 1506 may include, but are not limited to, computers, servers, personal digital assistants ("PDAs"), cellular phones, smartphones, or any suitable computing devices. The I/O devices 1508 enable a user to interface with the program modules 1516. In one embodiment, the I/O devices 1508 are operatively connected to an I/O controller (not shown) that enables communication with the processing unit 1502 via the system bus 1512. The I/O devices 1508 may include one or more input devices, such as, but not limited to, a keyboard, a mouse, or an electronic stylus. Further, the I/O devices 1508 may include one or more output devices, such as, but not limited to, a display screen or a printer. In some embodiments, the I/O devices 1508 can be used for manual controls for operations to exercise under certain situations.

The network devices 1510 enable the computer system 1500 to communicate with other networks or remote systems via a network 1518 Examples of the network devices 1510 include, but are not limited to, a modem, a RF or IR transceiver, a telephonic interface, a bridge, a router, or a network card. The network 1518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1518 may be a wired network such as, but not limited to, a Wide Area Network ("WAN"), a wired Personal Area Network ("PAN"), or a wired Metropolitan Area Network ("MAN"). The network 1518 may be any other network described herein.

Figure 16:
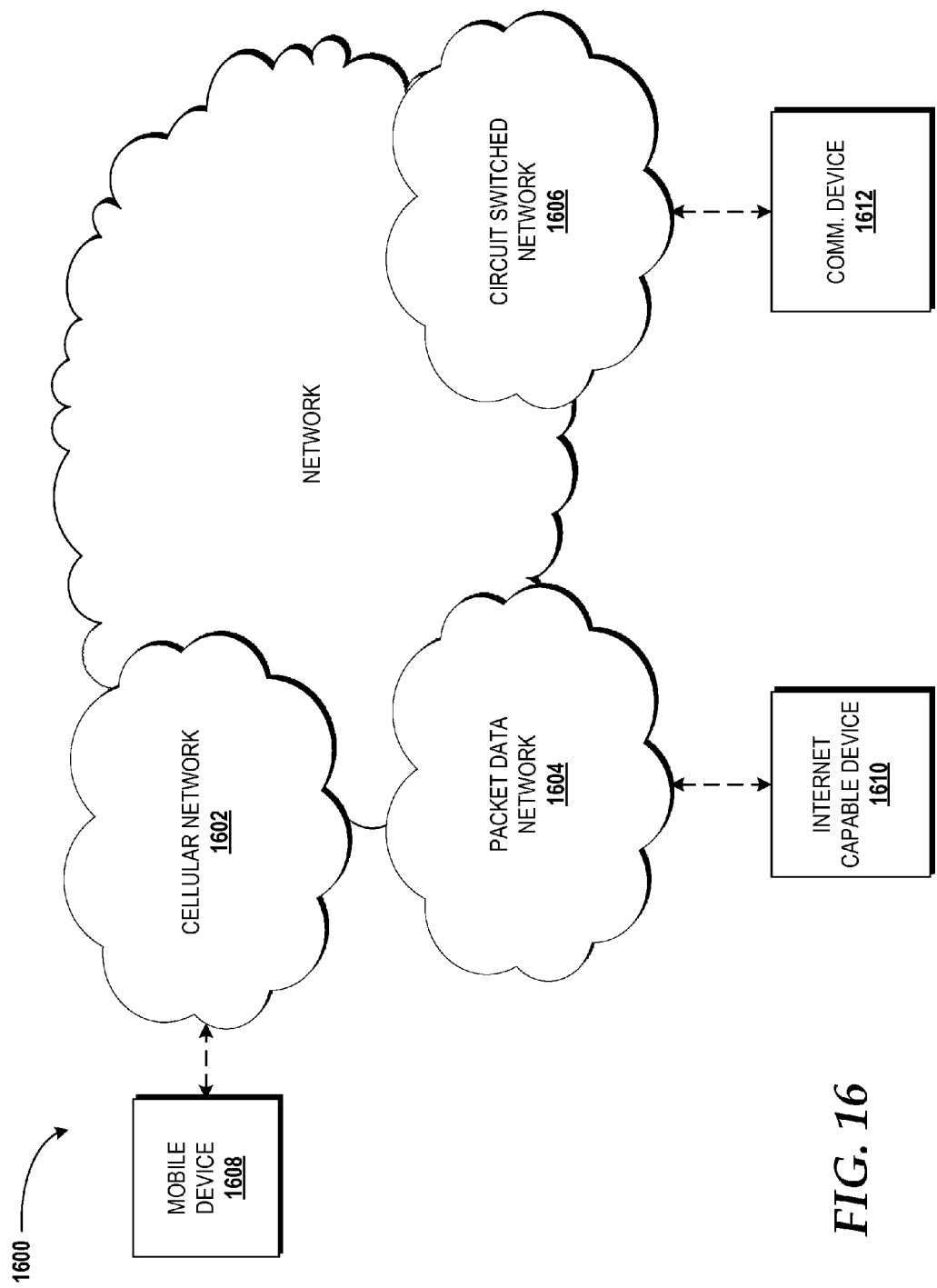
FIG. 16 is a diagram illustrating a network, according to an illustrative embodiment.

Turning now to FIG. 16, details of a network 1600 are illustrated, according to an illustrative embodiment. The network 1600 includes a cellular network 1602, a packet data network 1604, for example, the Internet, and a circuit-switched network 1606, for example, a public switched telephone network ("PSTN"). The cellular network 1602 includes various components such as, but not limited to, base transceiver stations ("BTSs"), node-B's or e-node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP multimedia subsystem ("IMS"), and the like. The cellular network 1602 also includes radios and nodes for receiving and transmitting voice, data, and combinations thereof to and from radio transceivers, networks, the packet data network 1604, and the circuit-switched network 1606.

A mobile communications device 1608, such as, for example, a cellular telephone, a user equipment, a mobile terminal, a PDA, a laptop computer, a handheld computer, and combinations thereof, can be operatively connected to the cellular network 1602. The cellular network 1602 can be configured as a 2G global system for mobile communications ("GSM") network and can provide data communications via general packet radio service ("GPRS") and/or enhanced data rates for GSM evolution ("EDGE"). Additionally, or alternatively, the cellular network 1602 can be configured as a 3G universal mobile telecommunications system ("UMTS") network and can provide data communications via the high-speed packet access ("HSPA") protocol family, for example, high-speed downlink packet access ("HSDPA"), enhanced uplink ("EUL") also referred to as high-speed uplink packet access ("HSUPA"), and HSPA+. The cellular network 1602 also is compatible with 4G mobile communications standards such as long-term evolution ("LTE"), or the like, as well as evolved and future mobile standards.

The packet data network 1604 includes various devices, for example, servers, computers, databases, and other devices in communication with one another, as is generally known. The packet data network 1604 can be or can include the network 1518. The packet data network 1604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1604 includes or is in communication with the Internet. The circuit-switched network 1606 includes various hardware and software for providing circuit-switched communications. The circuit-switched network 1606 may include, or may be, what is often referred to as a plain old telephone system ("POTS"). The functionality of a circuit-switched network 1606 or other circuit-switched network are generally known and will not be described herein in detail.

The illustrated cellular network 1602 is shown in communication with the packet data network 1604 and a circuit-switched network 1606, though it should be appreciated that this is not necessarily the case. One or more Internet-capable devices 1610, for example, a PC, a laptop, a portable device, or another suitable device, can communicate with one or more cellular networks 1602, and devices connected thereto, through the packet data network 1604. It also should be appreciated that the Internet-capable device 1610 can communicate with the packet data network 1604 through the circuit-switched network 1606, the cellular network 1602, and/or via other networks (not illustrated).

As illustrated, a communications device 1612, for example, a telephone, facsimile machine, modem, computer, or the like, can be in communication with the circuit-switched network 1606, and therethrough to the packet data network 1604 and/or the cellular network 1602. It should be appreciated that the communications device 1612 can be an Internet-capable device, and can be substantially similar to the Internet-capable device 1610. In the specification, the network is used to refer broadly to any combination of the networks 1602, 1604, 1606 shown in FIG. 16 and/or the network 1518. It should be appreciated that substantially all of the functionality described with reference to the network 1518 can be performed by the cellular network 1602, the packet data network 1604, and/or the circuit-switched network 1606, alone or in combination with other networks, network elements, and the like.

Based on the foregoing, it should be appreciated that concepts and technologies directed to modes of policy participation for feedback instances have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system, comprising:
a processing unit; and
a memory unit that stores instructions that, when executed by the processing unit, cause the processing unit to perform operations comprising
monitoring a plurality of events for anomalies, wherein each of the plurality of events can impact a policy participation level of an active feedback instance operating in a runtime, wherein the active feedback instance comprises an intentional, directed feedback loop that can be utilized to effect a policy in a cloud computing environment,
in response to detecting an anomaly within the plurality of events, receiving an event associated with the anomaly,
mapping the event to the policy, and
determining a new policy participation level for the active feedback instance according to the policy.

2. The system of claim 1, wherein the operations further comprise subscribing to the plurality of events.

3. The system of claim 2, wherein receiving the event associated with the anomaly comprises receiving the event associated with the anomaly as a result of a subscription to the event.

4. The system of claim 1, wherein mapping the event to the policy comprises mapping the event to a set of policies, wherein the set of policies comprises the policy.

5. The system of claim 1, wherein the operations further comprise determining a duration of the new policy participation level.

6. The system of claim 5, wherein the operations further comprise reverting back to an original policy participation level after the duration.

7. The system of claim 1, wherein the operations further comprise adjusting a feedback instance model associated with the active feedback instance to accommodate the new policy participation level and storing the feedback instance model as adjusted in an active feedback instance model storage of a feedback instance model repository.

8. The system of claim 7, wherein the operations further comprise directing a further system to realize a further feedback instance based upon the feedback instance model.

9. A computer-readable storage medium comprising computer-executable instructions that, when executed by a processing unit of a system, cause the system to perform operations comprising:

monitoring a plurality of events for anomalies, wherein each of the plurality of events can impact a policy participation level of an active feedback instance operating in a runtime, wherein the active feedback instance comprises an intentional, directed feedback loop that can be utilized to effect a policy in a cloud computing environment, in response to detecting an anomaly within the plurality of events, receiving an event associated with the anomaly, mapping the event to the policy, and determining a new policy participation level for the active feedback instance according to the policy.

10. The computer-readable storage medium of claim 9, wherein the operations further comprise subscribing to the plurality of events.

11. The computer-readable storage medium of claim 10, wherein receiving the event associated with the anomaly comprises receiving the event associated with the anomaly as a result of a subscription to the event.

12. The computer-readable storage medium of claim 9, wherein mapping the event to the policy comprises mapping the event to a set of policies, wherein the set of policies comprises the policy.

13. The computer-readable storage medium of claim 9, wherein the operations further comprise determining a duration of the new policy participation level.

14. The computer-readable storage medium of claim 13, wherein the operations further comprise reverting back to an original policy participation level after the duration.

15. The computer-readable storage medium of claim 9, wherein the operations further comprise;

adjusting a feedback instance model associated with the active feedback instance to accommodate the new policy participation level; and storing the feedback instance model as adjusted in an active feedback instance model storage of a feedback instance model repository.

16. The computer-readable storage medium of claim 15, wherein the operations further comprise directing a further system to realize a further feedback instance based upon the feedback instance model.

17. A method comprising:

subscribing, by a system comprising a processing unit, to a plurality of events, wherein each of the plurality of events can impact a policy participation level of an active feedback instance operating in a runtime, wherein the active feedback instance comprises an intentional, directed feedback loop that can be utilized to effect a policy in a cloud computing environment;

monitoring, by the system, the plurality of events for anomalies;

in response to detecting an anomaly within the plurality of events, receiving, by the system, an event associated with the anomaly;

mapping, by the system, the event to the policy, and determining a new policy participation level for the active feedback instance according to the policy.

18. The method of claim 17, wherein mapping the event to the policy comprises mapping the event to a set of policies, wherein the set of policies comprises the policy.

19. The method of claim 17, wherein further comprising:

determining a duration of the new policy participation level; and reverting back to an original policy participation level after the duration.

20. The method of claim 17, further comprising:

adjusting, by the system, a feedback instance model associated with the active feedback instance to accommodate the new policy participation level; and storing, by the system, the feedback instance model as adjusted in an active feedback instance model storage of a feedback instance model repository.

\* \* \* \* \*